United States Patent
Ferstl et al.

(10) Patent No.: US 10,691,943 B1
(45) Date of Patent: Jun. 23, 2020

(54) ANNOTATING IMAGES BASED ON MULTI-MODAL SENSOR DATA

(71) Applicant: Amazon Technologies, Inc., Seattle, WA (US)

(72) Inventors: David Ferstl, Graz (AT); Martin Koestinger, Graz (AT); Amir Navot, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 200 days.

(21) Appl. No.: 15/885,808

(22) Filed: Jan. 31, 2018

(51) Int. Cl.
| | |
|---|---|
| *G06K 9/62* | (2006.01) |
| *G06K 9/00* | (2006.01) |
| *G06N 3/08* | (2006.01) |
| *G06N 3/04* | (2006.01) |
| *B64D 47/08* | (2006.01) |
| *B64C 39/02* | (2006.01) |
| *H04N 5/33* | (2006.01) |

(52) U.S. Cl.
CPC .......... *G06K 9/0063* (2013.01); *B64C 39/024* (2013.01); *B64D 47/08* (2013.01); *G06K 9/6257* (2013.01); *G06K 9/6267* (2013.01); *G06K 9/6289* (2013.01); *G06N 3/0445* (2013.01); *G06N 3/08* (2013.01); *B64C 2201/127* (2013.01); *G06K 2009/00644* (2013.01); *G06K 2209/27* (2013.01); *H04N 5/332* (2013.01)

(58) Field of Classification Search
CPC .. G06K 9/0063; G06K 9/6289; G06K 9/6267; G06K 9/6257; G06K 2209/27; G06K 2209/00644; B64C 39/024; B64C 2201/127; G06N 3/08; G06N 3/0445; B64D 47/08; H04N 5/332
See application file for complete search history.

(56) References Cited

U.S. PATENT DOCUMENTS

| | | | | |
|---|---|---|---|---|
| 4,825,232 A | * | 4/1989 | Howdle | B64D 47/08 396/12 |
| 2004/0257441 A1 | * | 12/2004 | Pevear | B64D 47/08 348/144 |
| 2007/0211145 A1 | * | 9/2007 | Kilian | B61K 9/04 348/148 |
| 2015/0304612 A1 | * | 10/2015 | Richards | H04N 5/33 348/159 |
| 2016/0214534 A1 | * | 7/2016 | Richards | H04N 5/332 |
| 2016/0262631 A1 | * | 9/2016 | Shen | A61B 5/015 |

(Continued)

*Primary Examiner* — Carol Wang
(74) *Attorney, Agent, or Firm* — Athorus, PLLC

(57) ABSTRACT

Imaging data or other data captured using a camera may be classified based on data captured using another sensor that is calibrated with the camera and operates in a different modality. Where a digital camera configured to capture visual images is calibrated with another sensor such as a thermal camera, a radiographic camera or an ultraviolet camera, and such sensors capture data simultaneously from a scene, the respectively captured data may be processed to detect one or more objects therein. A probability that data depicts one or more objects of interest may be enhanced based on data captured from calibrated sensors operating in different modalities. Where an object of interest is detected to a sufficient degree of confidence, annotated data from which the object was detected may be used to train one or more classifiers to recognize the object, or similar objects, or for any other purpose.

20 Claims, 23 Drawing Sheets

(56) References Cited

U.S. PATENT DOCUMENTS

| | | | |
|---|---|---|---|
| 2016/0295208 A1* | 10/2016 | Beall | G06T 7/80 |
| 2017/0053169 A1* | 2/2017 | Cuban | H04N 7/185 |
| 2017/0275023 A1* | 9/2017 | Harris | H04N 13/239 |
| 2018/0054604 A1* | 2/2018 | Boyd | H04N 13/239 |
| 2018/0173245 A1* | 6/2018 | Twining | B64D 45/00 |

* cited by examiner

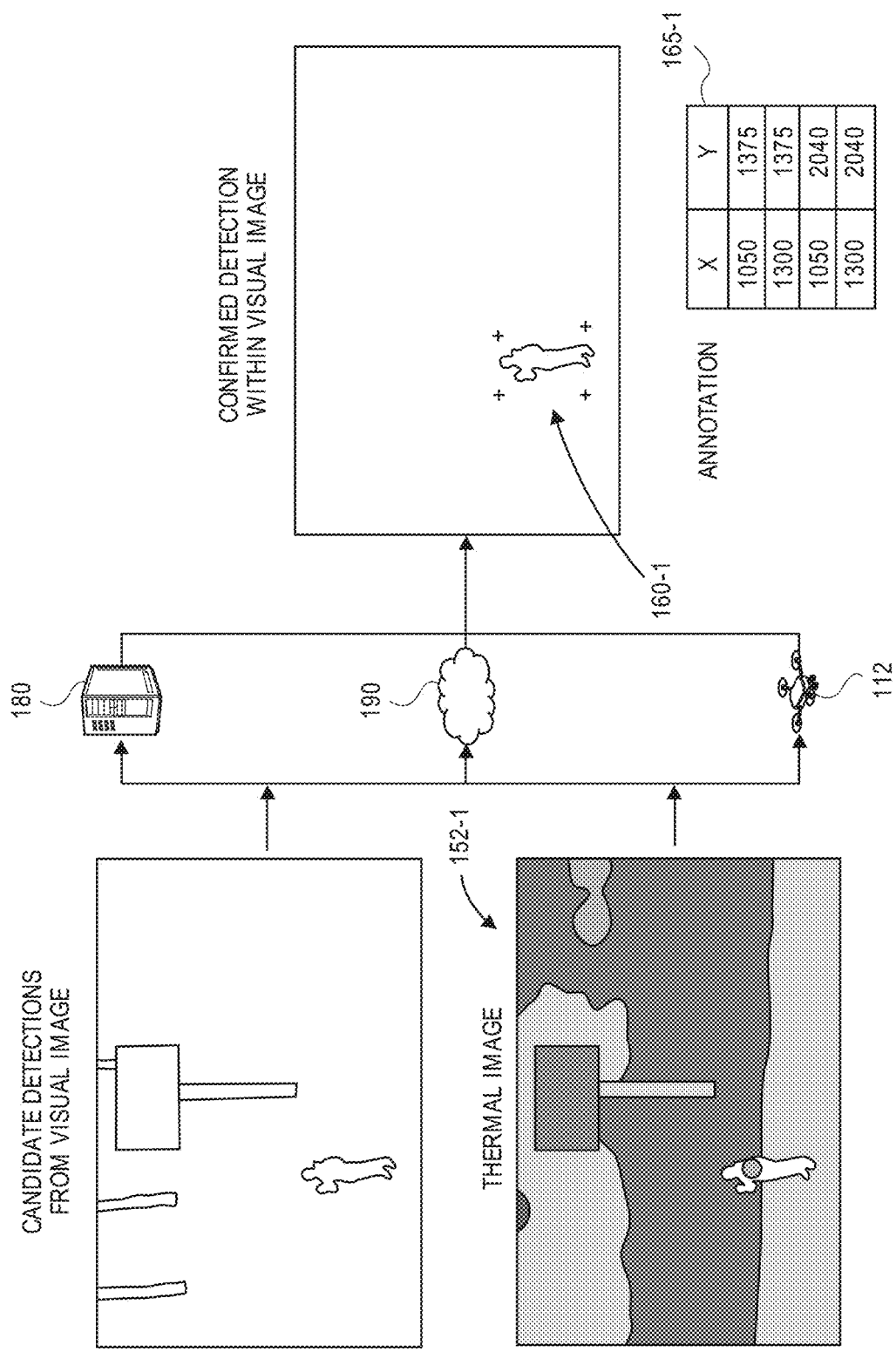

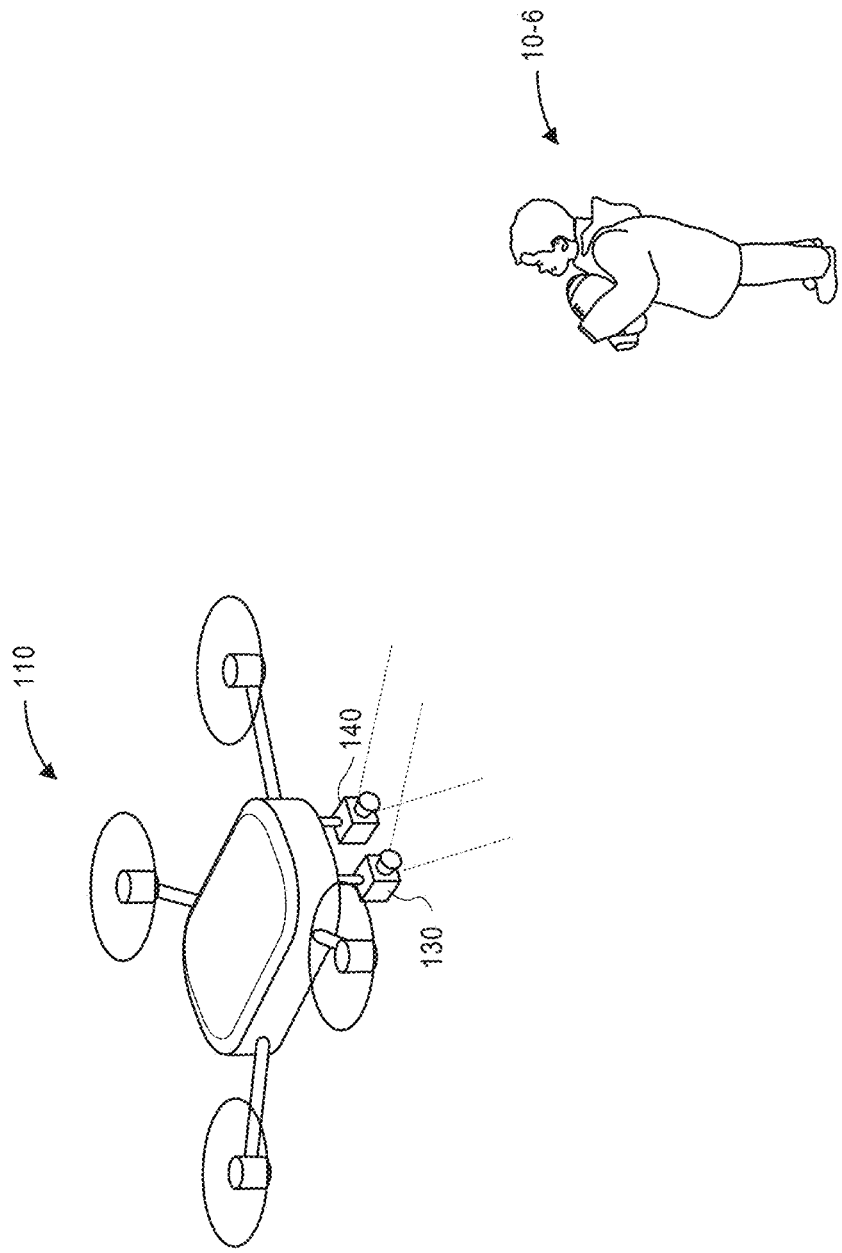

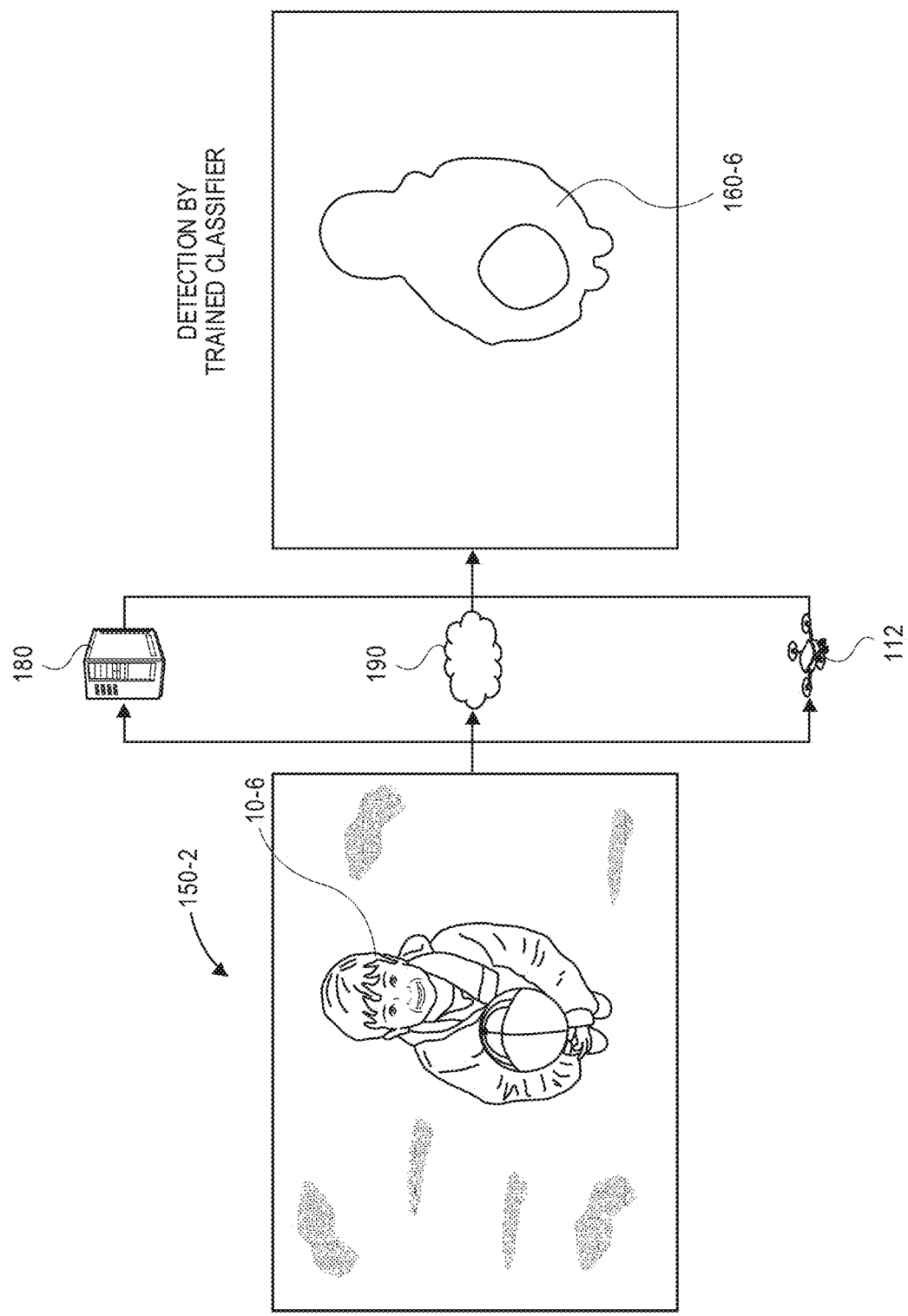

US 10,691,943 B1

ANNOTATING IMAGES BASED ON MULTI-MODAL SENSOR DATA

BACKGROUND

In computer vision applications, annotation (or labeling) is commonly known as the marking or designation of images or video files captured from a scene, such as to denote the presence and location of one or more objects or other features within the scene in the images or video files. Annotating an image or a video file typically involves placing a virtual marking such as a box or other shape on an image or one or more frames of a video file, thereby denoting that the image or the frame depicts an item, or includes pixels of significance, within the box or shape. Other methods for annotating an image or a video file may involve applying markings or layers including alphanumeric characters, hyperlinks or other markings on specific images or frames of a video file, thereby enhancing the functionality or interactivity of the image or the video file in general, or of the images or video frames in particular. Locations of the pixels of interest may be stored in association with an image or a video file, e.g., in a record maintained separately from the image or the video file, or in metadata of the image or the video file.

Two common reasons for annotating images or video files are to train computer vision algorithms, e.g., to feed an actual location of an item within an image or a video file to a computer vision algorithm in order to train the computer vision algorithm to recognize that the item is in that location within the image or video file, and also to validate computer vision algorithms, e.g., to compare an actual location of an item appearing in an image or a video file to a location of the item as determined by one or more of such algorithms.

Traditional manual and automatic methods for annotating images or video files have a number of limitations, however. First, annotating an image or a video file is very time-consuming for a human, who must visibly recognize the location of an item in an image or video file and also annotate an appropriately sized box or other shape around the item within the image or a frame of the video file. Next, most automatic methods for annotating an image or a video file are computationally expensive, and may require an intense amount of data and processing power in order to optimize their chances of success. For example, a ten-minute video file that was captured at a rate of thirty frames per second includes 18,000 image frames, each of which must be specifically marked with locations of objects of interest depicted therein, or designated as not depicting any such objects.

BRIEF DESCRIPTION OF THE DRAWINGS

FIGS. 1A through 1H are views of aspects of one system for annotating images based on multi-modal sensor data in accordance with embodiments of the present disclosure.

DETAILED DESCRIPTION

As is set forth in greater detail below, the present disclosure is directed to annotating (or labeling) data captured in one modality using data captured in another modality. More specifically, the present disclosure is directed to annotating (or labeling) images or video files captured by an imaging device (e.g., a digital camera configured to capture color, grayscale or black-and-white images) using complementary data captured using one or more other sensors that are calibrated with the imaging device. In some embodiments, attributes of an object of interest within each of the modalities may be utilized in determining probabilities that representations of data captured by calibrated sensors in each of such modalities depict the object of interest therein. A probability that a representation of data captured in one modality depicts the object may be enhanced based on a probability that a representation of data captured in another modality depicts the object. For example, where visual attributes of an object are known, and where other complementary attributes of the object are also known, detections of the object within complementary data captured using a sensor may be transposed into imaging data captured by an imaging device that is calibrated with the sensor, or vice versa. In this regard, the different modalities may be utilized to more accurately determine that data captured according to one modality (e.g., a visual image captured using a digital camera) depicts an object based at least in part on data captured according to another modality, or vice versa.

The systems and methods of the present disclosure may enhance not only a likelihood that an object is actually depicted within captured data, e.g., the accuracy of an annotation, but also a level of precision associated with an annotation, namely that the annotation is sufficiently narrowly directed to the object of interest. Annotated data may be utilized in any manner and for any purpose, e.g., to validate an output of a computer vision algorithm, or to train a computer vision algorithm, with respect to a single modality or multiple modalities accordingly.

Figure 1A:
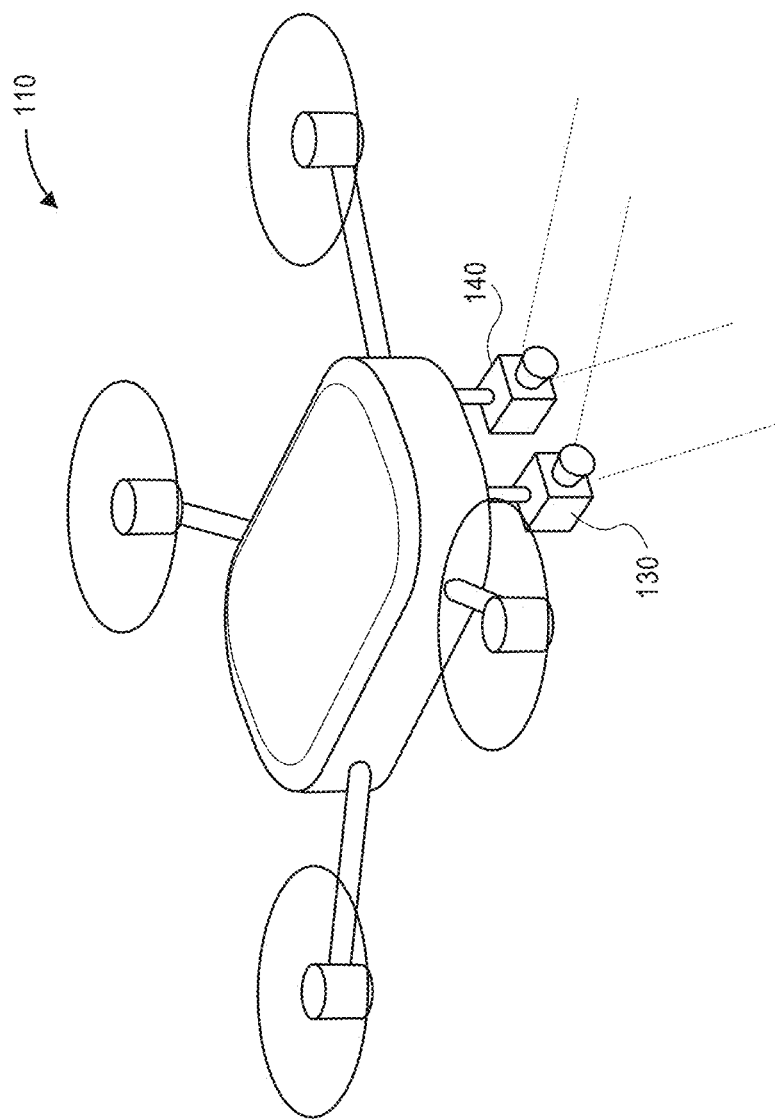
Figure 1B:
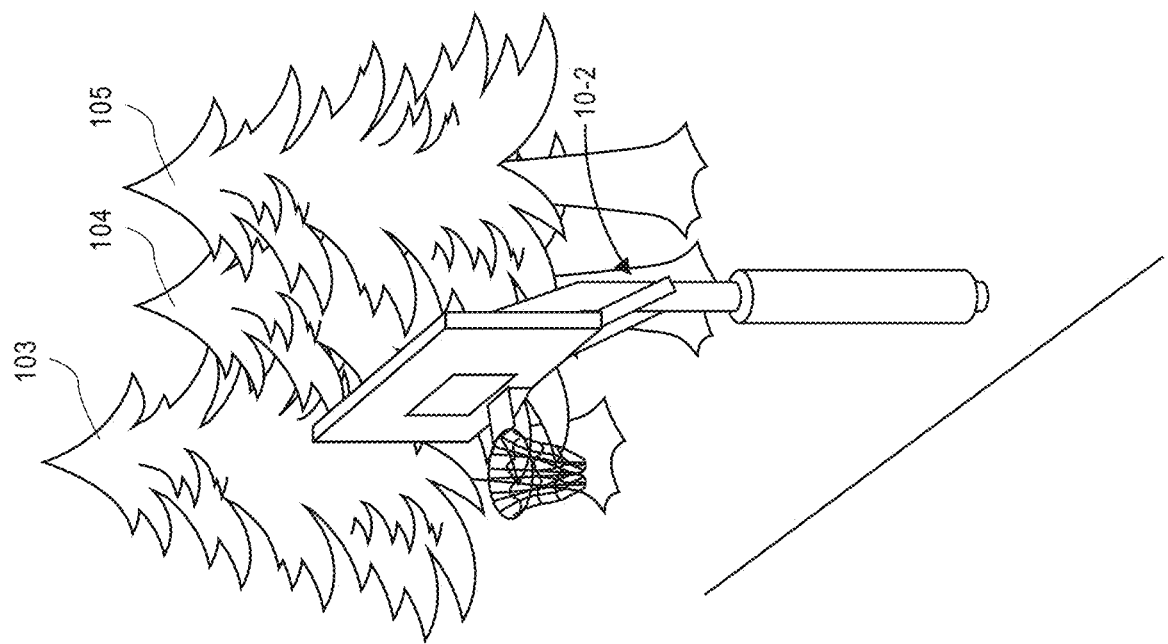
Figure 1B:
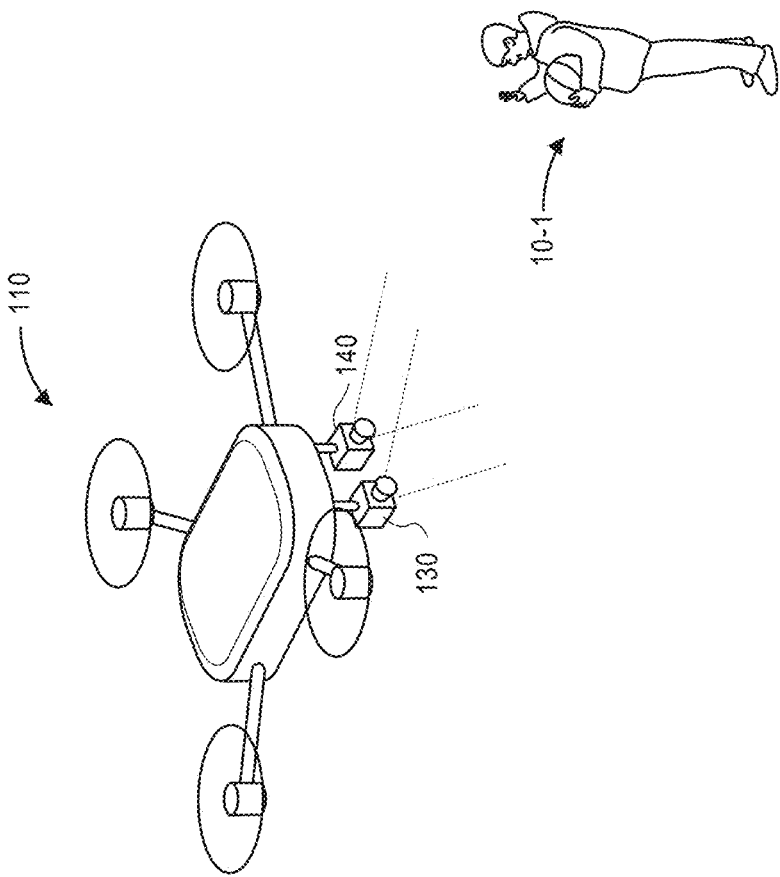

Referring to FIGS. 1A through 1H, views of aspects of one system for annotating images based on multi-modal sensor data in accordance with embodiments of the present disclosure are shown. As is shown in FIGS. 1A and 1B, an aerial vehicle 110 includes a visual imaging device 130 (e.g., a digital camera, or another primary sensor) and a thermal imaging device 140 (or another secondary sensor), along with one or more propulsion motors, control surfaces, frames, appurtenances or other components. The visual imaging device 130 and the thermal imaging device 140 are aligned to capture data forward of the aerial vehicle 110 as the aerial vehicle 110 operates within a scene, which may be any open or enclosed environment or space in which any number of actors (e.g., humans, other animals or machines) or other objects of varying types may be present and executing one or more poses, gestures or other actions within the fields of view of the imaging devices 130, 140. For example, as is shown in FIG. 1B, an actor 10-1 (e.g., a human), an artificial structure 10-2 (e.g., a basketball backboard and post) and natural structures 10-3, 10-4, 10-5 (e.g., trees) are within the fields of view of the imaging devices 130, 140.

The imaging devices 130, 140 are calibrated, such that mappings between coordinates of imaging data (e.g., coordinate pairs, or pairs of coordinates in a horizontal or x-direction and a vertical or y-direction within an image frame) captured by the visual imaging device 130 and the thermal imaging device 140 and directions relative to their respective sensors are known, or easily determined. The imaging devices 130, 140 are aligned with fields of view that overlap at least in part over a portion of the scene, and are configured to capture data in the form of visual images (e.g., color images, such as red-green-blue images, or "RGB" images) and/or thermal images (e.g., thermograms) from within their respective fields of view. Alternatively, or additionally, the imaging devices 130, 140 may be configured to capture imaging data of any other type or form.

Figure 1C:
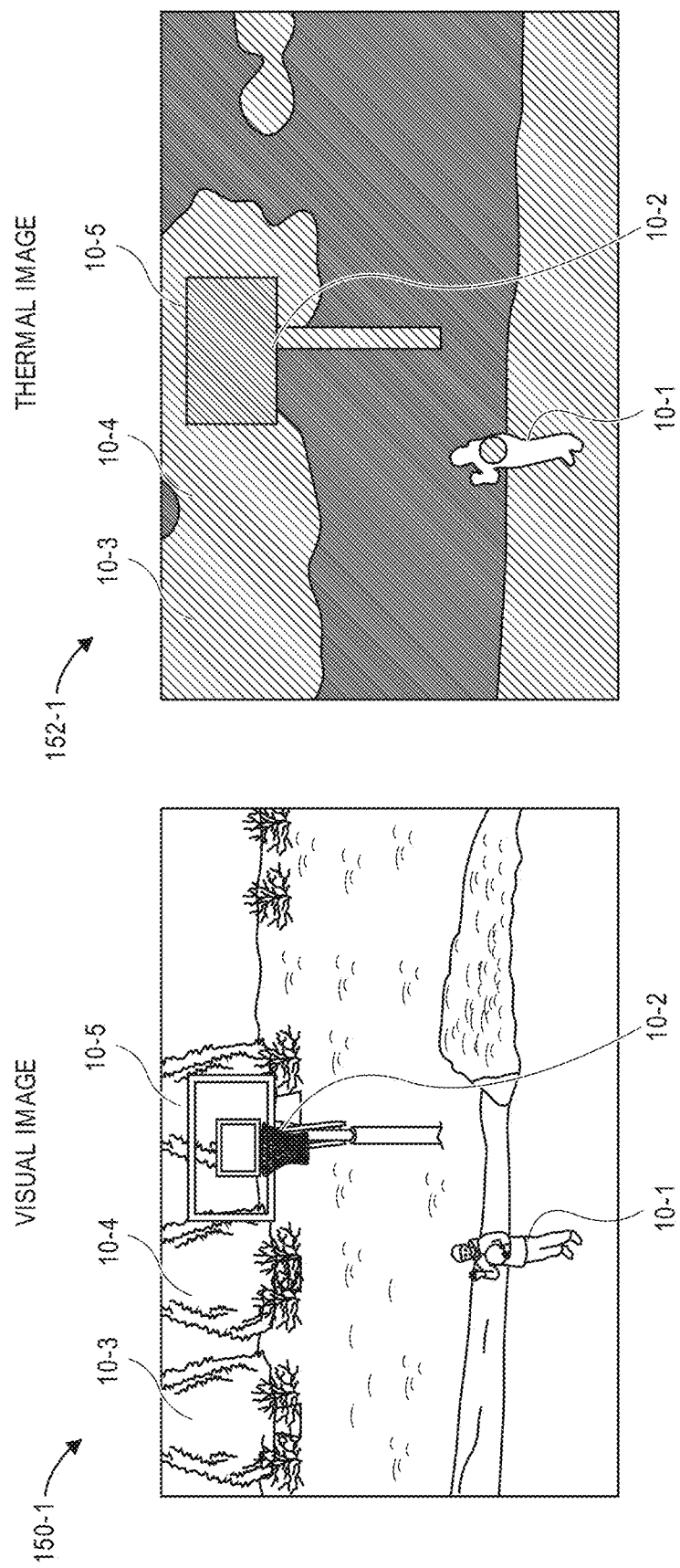

As is shown in FIG. 1C, a visual image 150-1 captured by the visual imaging device 130 and a thermal image 150-2 captured using the thermal imaging device 140 depict visual and thermal attributes of aspects of the scene, including but not limited to the actor 10-1, the artificial structure 10-2 and/or the natural structures 10-3, 10-4, 10-5. For example, the visual image 150-1 depicts visible contrasts associated with foreground aspects of the scene with respect to background aspects, including portions corresponding to the actor 10-1, the artificial structure 10-2 and/or the natural structures 10-3, 10-4, 10-5, such as blue clothing worn by the actor 10-1, black paint on the artificial structure 10-2, or green and brown colors of the natural structures 10-3, 10-4, 10-5, and other colors of background features. Similarly, the thermal image 150-2 depicts infrared radiation (e.g., heat) emitted by aspects of the scene, including portions corresponding to the actor 10-1, the artificial structure 10-2 and/or the natural structures 10-3, 10-4, 10-5. Such aspects may radiate infrared radiation at constant or variable rates, and the infrared radiation may increase or decrease accordingly, e.g., due to heating or cooling by conduction, convection, radiation, or any other means. For example, whereas the actor 10-1 is a human having a body temperature of approximately ninety-nine degrees Fahrenheit (99° F.), the thermal image 150-2 depicts contrasts due to infrared radiation released by the actor 10-1 due to a difference in temperature between the actor 10-1 and ambient temperatures at the scene. Likewise, whereas the artificial structure 10-2 is painted black, and has absorbed heat in the form of solar radiation, the thermal image 150-2 depicts contrasts due to infrared radiation released by the artificial structure 10-2 due to a difference in temperature between the artificial structure 10-2 and ambient temperatures at the scene. Moreover, whereas the natural structures 10-3, 10-4, 10-5 are unable to generate heat on their own, and are thus at ambient temperatures at the scene, the thermal image 150-2 does not depict any substantial contrasts based on infrared radiation released by the natural structures 10-3, 10-4, 10-5.

Figure 1D:
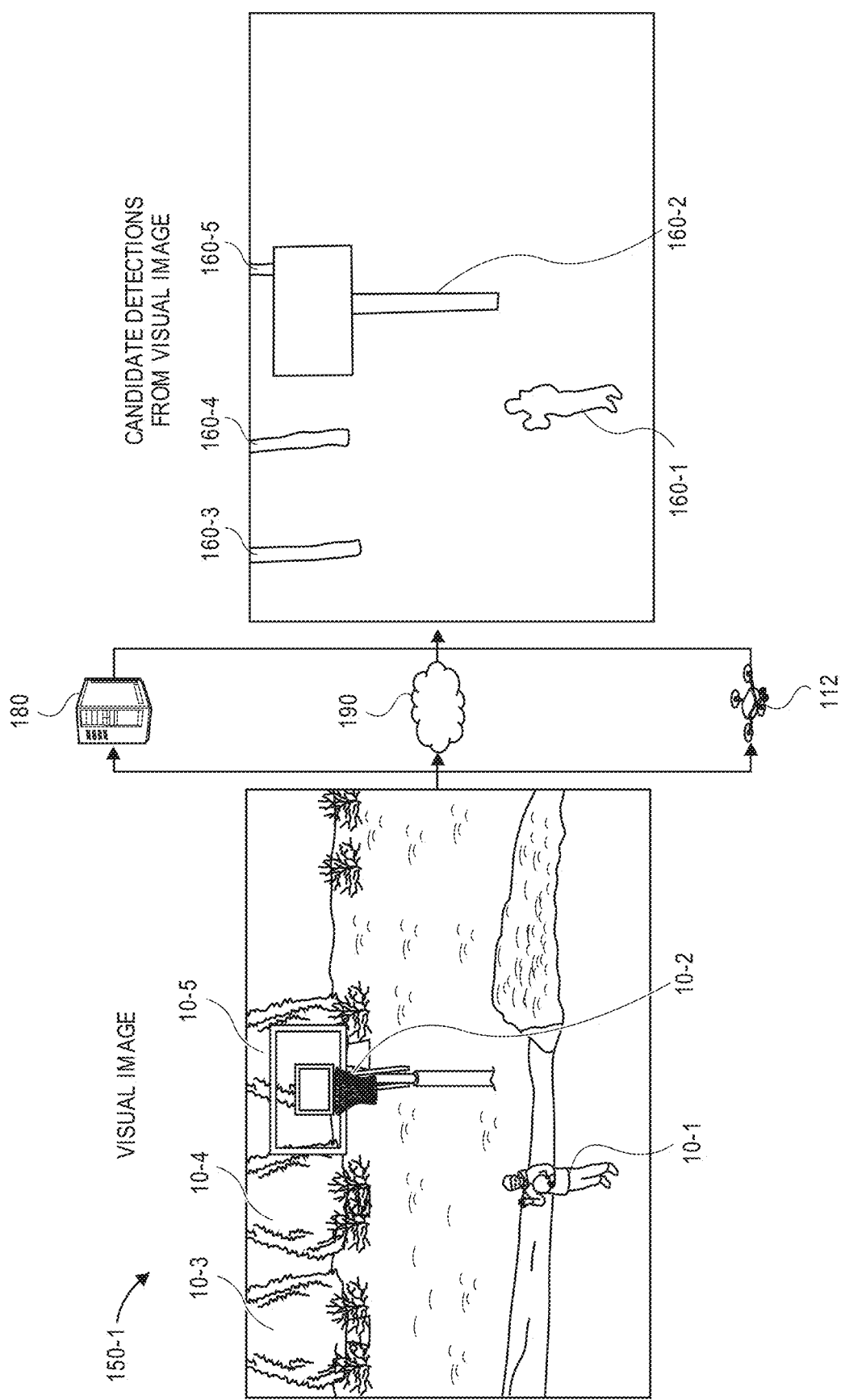

As is discussed above, data captured by calibrated sensors may be respectively processed to determine whether such data depicts one or more attributes of an object of interest. As is shown in FIG. 1D, the visual image 150-1 may be provided to one or more object detection algorithms or other techniques for identifying a human or another object of a type, within the visual image 150-1. For example, such algorithms or techniques may operate on a ground-based server 180 (or one or more servers) associated with one or more physical locations, e.g., in stations or facilities from which the aerial vehicle 110 departed, to which the aerial vehicle 110 is headed, or at which the aerial vehicle 110 is typically housed, based or stored. Alternatively, such algorithms or techniques may operate in one or more alternate or virtual locations, e.g., in a "cloud"-based system 190. In still other embodiments, such algorithms or techniques may operate on one or more processors 112 onboard one or more aerial vehicles, including but not limited to the aerial vehicle 110. Based on the visual image 150-1, a plurality of candidate detections 160-1, 160-2, 160-3, 160-4, 160-5, e.g., colors, textures, outlines or other aspects of the actor 10-1, the artificial structure 10-2, and the natural structures 10-3, 10-4, 10-5, corresponding to portions of the visual image 150-1 that might depict a human may be identified.

As is shown in FIG. 1E, after the candidate detections 160-1, 160-2, 160-3, 160-4, 160-5 have been identified within the visual image 150-1, the candidate detections 160-1, 160-2, 160-3, 160-4, 160-5 and the thermal image 150-2 may be analyzed, e.g., by the server 180, the cloud-based system 190 or the processors 112 onboard the aerial vehicle 110 in order to determine which, if any, of the candidate detections 160-1, 160-2, 160-3, 160-4, 160-5 likely corresponds to a human. For example, because the visual image 150-1 and the thermal image 150-2 are calibrated, the candidate detections 160-1, 160-2, 160-3, 160-4, 160-5 may be transposed onto the thermal image 150-2, and portions of the thermal image 150-2 corresponding to the candidate detections 160-1, 160-2, 160-3, 160-4, 160-5 may be evaluated with respect to attributes of humans, e.g., normal body temperatures and the like, to determine which of the candidate detections 160-1, 160-2, 160-3, 160-4, 160-5 corresponds to a human. Alternatively, the thermal image 150-2 may be provided to an object detection algorithm or like technique that is trained to detect portions of thermal images that likely correspond to humans or other objects of specific or general types, in a manner similar to that shown in FIG. 1D for the visual image 150-1, based on detected infrared radiation (e.g., heat) levels depicted therein. Rather than analyzing the entire thermal image 150-2, portions of the thermal image 150-2 having candidate detections of humans may be analyzed, along with the candidate detections 160-1, 160-2, 160-3, 160-4, 160-5 from the visual image 150-1.

As is also shown in FIG. 1E, the server 180, the cloud-based environment 190 and/or the processors 112 may determine that the detection 160-1 within the visual image 150-1 corresponds to a human, based on the portions of thermal images that correspond to the detection 160-1, and define an annotation 165-1 with respect to the detection 160-1. The annotation 165-1 may signify the presence of an object of interest, viz., the actor 10-1 and/or the detection 160-1, in any number of ways. For example, as is shown in FIG. 1E, the annotation 165-1 designates coordinates of a box (or, alternatively, another polygon or other two-dimensional shape) within an image plane of the visual image 150-1 that identifies a portion of the visual image 150-1 corresponding to a human or, alternatively, identifies a region in three-dimensional space including the human. In some embodiments, some or all of the visual image 150-1 may be subjected to semantic segmentation, such that pixels of the visual image 150-1 are assigned to one of a plurality of objects or object classes. For example, referring again to FIG. 1E, each of the pixels of the visual image 150-1 may be identified as associated with one of the candidate detections 160-1, 160-2, 160-3, 160-4, 160-5, at a pixel-level, or as associated with one or more background features, along with a label of the one of the candidate detections 160-1, 160-2, 160-3, 160-4, 160-5, or of one or more classes of objects to which the respective detections 160-1, 160-2, 160-3, 160-4, 160-5 belong. The annotation 165-1 may include thus identifiers of each of the pixels that corresponds to the detection 160-1, as well as a label of an object (e.g., an indication that the detection 160-1 is the specific human, identified by name) or a class of object (e.g., an indication that the detection 160-1 is a human in general, or a boy in particular) to which the detection 160-1 most likely corresponds. The annotation 165-1 may further include, for each of the pixels included in the detection 160-1 or for the detection 160-1 as a whole, a measure of probability that the detection 160-1 is the object or the class of object associated with the label.

Regardless of its form, the annotation 165-1 may be stored in a record or other file in a data store, in association with the visual image 150-1, e.g., with respect to an identifier or other aspect of the visual image 150-1, or, alternatively, in metadata of the visual image 150-1, or in any other record, file or location.

Figure 1F:
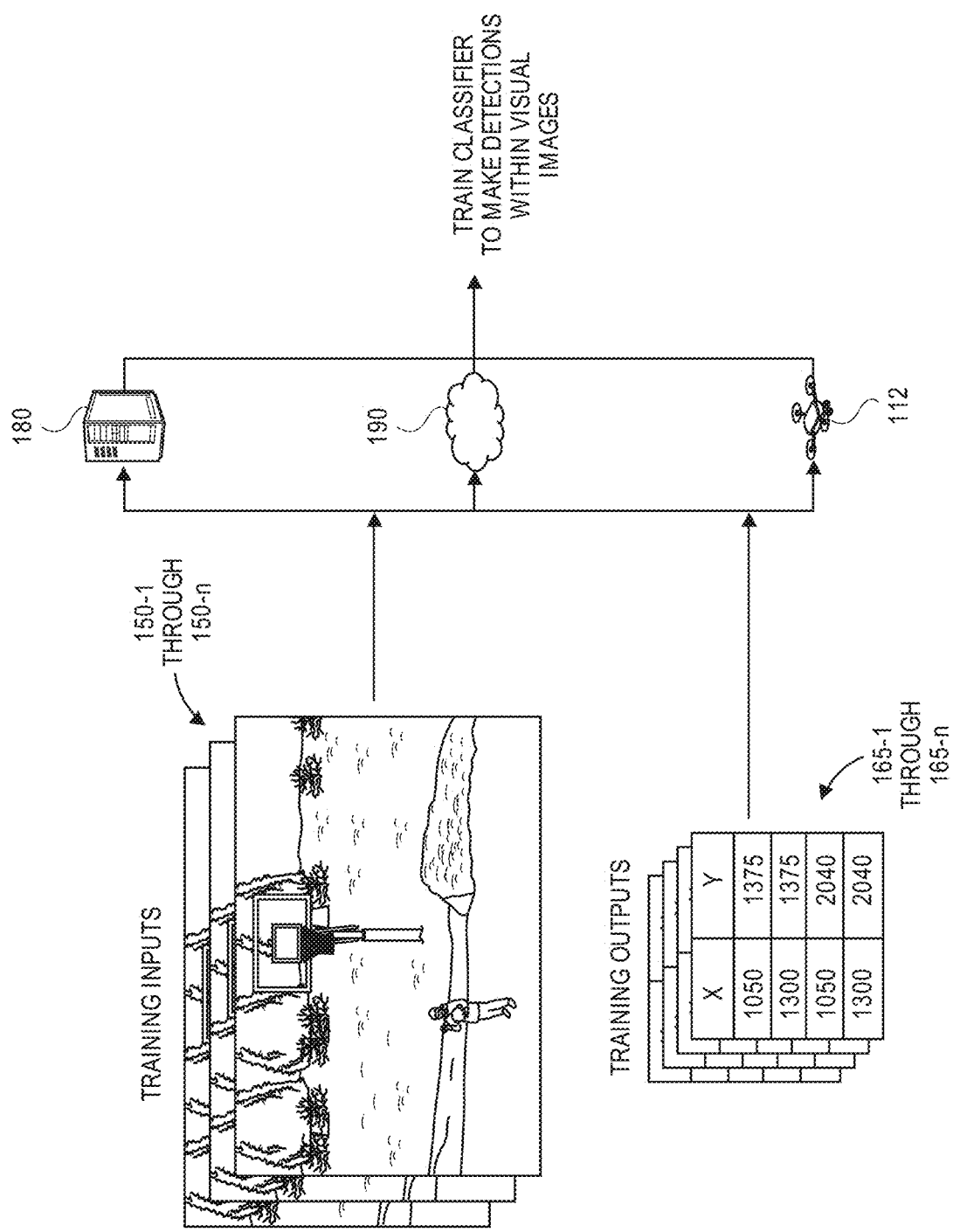

In accordance with the present disclosure, annotations that are determined based on data captured using another calibrated sensor (e.g., the thermographic imaging device 140 of FIG. 1A) may be used to train a classifier to recognize one or more objects more efficiently, and with greater confidence, than if the annotations were identified based on content of visual images alone. As is shown in FIG. 1F, a plurality of visual images 150-1 through 150-n are provided to an object detection algorithm operating on the server 180, the cloud-based environment 190 and/or the processors 112 as training inputs, and a plurality of annotations 165-1 through 165-n of such visual images 150-1 through 150-n are provided to the object detection algorithm as training outputs. In some embodiments, the training inputs may further include any other metadata associated with the visual images 150-1 through 150-n, including but not limited to identifiers of prevailing environmental conditions at times at which the visual images 150-1 through 150-n were captured, identifiers of hardware or settings of a digital camera, viz., the visual imaging device 130, that captured the visual images 150-1 through 150-n, or any other information or data. Additionally, in some embodiments, a negative set of training inputs may also be provided to the server 180, the cloud-based environment 190 and/or the processors 112, with the negative set including visual images that do not depict any humans, along with training outputs including indications that such visual images do not depict any humans. Training an object detection algorithm to recognize a human or any other object of any type in this regard, e.g., using images of the humans and annotations of their respective locations within such images, and also images of things that are not humans, may enable the object detection algorithm to remain robust against textures and patterns of clothing of humans, as well as other objects. The trained algorithm may also be resistant against exposure variations and/or color variations in the images captured from the scene, or any other factors.

Once the object detection algorithm has been trained to recognize humans or other objects of any type using data obtained from multiple modalities, visual images may be provided to the object detection algorithm as inputs, and locations of objects depicted therein may be identified based on outputs from the object detection algorithm. For example, as is shown in FIG. 1G, the aerial vehicle 110 approaches a scene having an actor 10-6, and captures a visual image 150-2 using the visual imaging device 130. As is shown in FIG. 1H, the visual image 150-2 may be provided to the object detection algorithm operating on processors 112 aboard the aerial vehicle 110 or, alternatively, on the server 180 or in the cloud-based environment 190, and may be used to identify a detection 160-6 of a human therein. Therefore, the detection 160-6 may be presumed to more likely correspond to a human, e.g., to a greater degree of accuracy and confidence, than if the object detection algorithm had been trained based on visual data alone. Upon determining that the detection 160-6 is the actor 10-6, to a sufficiently high degree of accuracy or confidence, the aerial vehicle 110 may take any relevant action, including but not limited to specifically avoiding the actor 10-6, communicating with the actor 10-6, capturing additional images of the actor 10-6, or any other action.

Many modern imaging systems, vehicles or computer systems rely on automatic object detection systems that operate based on machine learning algorithms. For example, unmanned aerial vehicles, or other autonomous vehicles, utilize automatic object detection systems to ensure that the vehicles are operated safely and autonomously during the performance of one or more missions. In some such systems, machine learning algorithms such as deep neural networks (e.g., artificial neural networks having multiple hidden layers provided between an input layer and an output layer) process massive amounts of sensor data and associated ground truth that depict one or more objects of interest. Sensor data and ground truth may be used to train object detection models for use on imaging data captured by digital cameras or other imaging devices, e.g., color images, gray-scale images or black-and-white images. In order to train the object detection models, however, the imaging data must be annotated, or labeled, to identify the portions of the imaging data depicting one or more objects of interest.

Annotating images or video files is a time-consuming task, particularly when the files to be annotated are large in number, at least because annotation typically requires a human operator to manually designate a bounding region (or other region of interest) within each image frame of a video file. For example, where identifying locations in which a cat appears within a video file is desired, a bounding region must be formed around image pixels corresponding to the cat in each frame in which the cat appears. The task of annotating images or video files is particularly burdensome where imaging devices for which the trained object detection model are to be utilized are in motion, such as when the imaging devices are operated aboard an unmanned aerial vehicle or another autonomous mobile system (e.g., a robot). In such embodiments, the object detection model is preferably trained to recognize objects to sufficiently high degrees of confidence, at high rates of speed. The need to properly train an object detection model to recognize an object of interest to a sufficiently high degree of confidence, and at high rates of speed, necessarily requires large volumes of annotated images or video files, as well as sufficient processing power for training a model based on such files.

Moreover, currently, images and video files are annotated based on the contents of the images or video files alone. For example, images are currently labeled based on the identification of objects therein, e.g., by humans, the automatic detection of objects therein, e.g., by machine learning tools trained to recognize such objects therein, or based on variations in temporal context of the images. For example, where a video file contains a plurality of image frames in series, an object that is manually identified or automatically detected within one of the image frames may be tracked in successive frames, as the object remains identifiable or detectable therein. Such procedures are complicated or ineffective in complex scenes, with multiple objects to be recognized or tracked, or where one or more objects are subject to occlusion.

Accordingly, the systems and methods of the present disclosure are directed to the annotation of images or video files captured from a scene based on data captured by multiple sensors that operate in multiple modes or modalities. Where data is captured using two calibrated sensors operating in different modalities, e.g., an imaging device calibrated with a sensor such as a thermographic camera, a radiographic camera, a radar sensor, a laser sensor, or any other type or form of sensor, the data may be processed to aid in the recognition of objects of interest within the captured data. For example, where a digital camera (e.g., a visual camera configured to capture color images, greyscale images or black-and-white images) is calibrated with a thermographic camera that is configured to capture thermograms, or thermal images, the digital camera and the thermographic camera may capture images from a common scene that are time-stamped or otherwise synchronized, or nearly synchronized. A thermogram indicative of infrared radiation emitted by objects within a field of view of the thermographic camera may be correlated with a visual image indicative of light reflected by the same objects within a field of view of the digital camera to aid in the detection of objects within the visual image. For example, where attributes of one or more objects of interest are known, attributes of objects that are recognized within complementary data, e.g., a thermogram, or any other data, may be utilized either separately or in conjunction with attributes of objects such as colors, textures or outlines that are recognized within a visual image, in order to annotate the visual image as to the locations of such objects therein. To the extent that attributes of a common object are recognized within data captured in a different modality, such as a thermogram, or in multiple modalities, such as in both a thermogram and a visual image, confidence in a detection of the common object within the visual image may be enhanced.

Because manual annotation is labor-intensive, and because traditional methods for automatic annotation are computationally expensive, one or more embodiments of the present disclosure rely on calibrated relationships of multiple sensors to correlate data captured by the respective sensors. Data representative of an attribute of an object within one set of data captured by one of the sensors may be transposed to another set of data captured by another of the sensors. For example, a human body typically has a normal temperature range between approximately 97 to 99 degrees Fahrenheit (97° F.-99° F.). Therefore, aspects of a human body depicted within a thermogram will be distinguished by visual contrast from background areas or aspects of other objects that are at different temperatures (e.g., ambient temperatures, or temperatures normally associated with such objects). Likewise, a human body typically features one head, one neck, one torso, a pair of arms extending from the torso and a pair of legs extending from the torso, and may be defined with respect to known physiological parameters or constraints, e.g., lengths or distances of one or more body parts, or configurations of such body parts with respect to one another. For example, a femur extends between a hip and a knee and has a length of approximately 50.5 centimeters in an average adult male. Similarly, a tibia and a fibula extend between a knee and an ankle, and have lengths of approximately 43.0 centimeters and 40.5 centimeters, respectively, in an average adult male. A humerus, which extends between a shoulder and an elbow, has a length of approximately 36.5 centimeters in an average adult male, while ulna and radii, which extend between elbows and hands, have lengths of approximately 28.2 centimeters and 26.4 centimeters, respectively, in average adult males. Additionally, it is commonly understood that knees are connected to hips and ankles, but not to shoulders, and that heads are connected to necks, but not to wrists. Such parameters or constraints, which may include not only bone lengths or configurations but also distance constraints, articulation constraints or deformation constraints, should be both feasible and proportional for humans, and must remain constant over time, given that actors may not typically change the lengths of their limbs or their respective configurations or orientations over time. In some embodiments, standard body proportions such as those defined by the Vitruvian Man of Leonardo da Vinci, or similar ratios or proportions, may be used determine relations of dimensions of two or more body parts to one another. Alternatively, known physiological parameters or constraints for bodies other than those of humans, or parameters or constraints of robots or other machines, may also be considered when generating such vectors or vector fields.

In accordance with the present disclosure, the detection of visual attributes corresponding to a human within a visual image may be transposed onto the detection of thermal attributes or other complementary attributes corresponding to a human within a thermogram or other complementary data, or vice versa, thereby increasing the probability that the visual image actually depicts a human in a given location. The processes by which representations of data are transposed from data captured in one modality to data captured in another modality may be repeated, as necessary, as long as an object of interest that is the subject of the annotation remains present within either of the representations of data. Confidence levels may be determined for each of the modalities, and an annotation may be updated, deleted or relocated (or a human operator may be prompted to update, delete or relocate the annotation), as necessary, based on the confidence level. Moreover, data may be transposed at any level of resolution or specificity. For example, data may be transposed at a pixel level, such that each of the sets of data is semantically segmented with an identifier of an object or class of object detected therein, as well as an identifier of a probability or likelihood associated with a detection, and an identifier of data or modalities from which the object was detected. Alternatively, data may be transposed based on sets of pixels, such that a location of a set of pixels detected as corresponding to an object within a first set of data captured in a first modality may be transposed to a second set of data captured in a second modality, and a detection of the object in the second set of data may be determined based on the set of pixels within the first set of data, either exclusively or in concert with other data or detections.

Additionally, a record of annotations corresponding to images or video files may be maintained and subsequently used for any purpose. For example, annotation data may be used to validate an output of a computer vision algorithm (such as to compare an actual location of an item shown in an image or a video frame to a location of the item as determined by a computer vision algorithm), or to train a computer vision algorithm (e.g., to feed an actual location of an item within an image or video frame to the algorithm in order to train the computer vision algorithm to recognize that the item is in that location in the image or video frame).

In some embodiments, detections of objects of interest in multiple modalities may each be used to train classifiers to recognize the objects of interest in their respective modalities. For example, an annotation of an object of interest in a visual image may be determined using contents of the visual image and any complementary data, e.g., a thermogram captured synchronously or nearly synchronously with the visual image. The annotation may be stored in association with the visual image, e.g., in one or more data stores, and the annotation and the visual image may be provided to a classifier as a training input and a training output, respectively, for training the classifier to detect the object of interest within visual imaging data. Conversely, an annotation of an object of interest in a thermogram may be determined using the contents of the thermogram and any complementary data, e.g., a visual image captured synchronously or nearly synchronously with the thermogram. The annotation may be stored in association with the thermogram, and the annotation and the thermogram may be provided to a classifier as a training input and a training output, respectively, for training the classifier to detect the object of interest within thermal imaging data.

Alternatively, detections of objects of interest within two or more modalities may be used to train a classifier to recognize objects of interest within one or more of the modalities. For example, where an annotation of a location of an object of interest within a visual image captured simultaneously with a thermogram by calibrated sensors (e.g., a digital camera calibrated with a thermographic camera), the visual image and the thermal image may be provided to a classifier as training inputs, and the annotations within each of the respective modalities may be provided to the classifier as training outputs, respectively, for training the classifier to detect the object of interest within visual imaging data or thermal imaging data.

Those of ordinary skill in the pertinent arts will recognize that imaging data, e.g., visual imaging data, depth imaging data, infrared imaging data, radiographic imaging data, or imaging data of any other type or form, may be captured using one or more imaging devices such as digital cameras, depth sensors, range cameras, thermal imaging cameras (e.g., infrared cameras), radiographic cameras, ultraviolet cameras, radiographic camera, radar sensors, or laser sensors. Such devices generally operate by capturing light (or other radiation) that is reflected from objects, and by subsequently calculating or assigning one or more quantitative values to aspects of the reflected light, e.g., image pixels, then generating an output based on such values, and storing such values in one or more data stores. For example, a digital camera may include one or more image sensors (e.g., a photosensitive surface with a plurality of pixel sensors provided thereon), having one or more filters associated therewith. Such sensors may detect information regarding aspects of any number of image pixels of the reflected light corresponding to one or more base colors (e.g., red, green or blue) of the reflected light, or distances to objects from which the light was reflected. Such sensors may then generate data files including such information, and store such data files in one or more onboard or accessible data stores (e.g., a hard drive or other like component), or in one or more removable data stores (e.g., flash memory devices). Such data files may also be printed, displayed on one or more broadcast or closed-circuit television networks, or transmitted over a computer network as the Internet.

An imaging device that is configured to capture and store visual imaging data (e.g., color images) is commonly called an RGB ("red-green-blue") imaging device (or camera), while an imaging device that is configured to capture both visual imaging data and depth imaging data (e.g., ranges) is commonly referred to as an RGBz or RGBD imaging device (or camera). Imaging data files may be stored in any number of formats, including but not limited to .JPEG or .JPG files, or Graphics Interchange Format (or ".GIF"), Bitmap (or ".BMP"), Portable Network Graphics (or ".PNG"), Tagged Image File Format (or ".TIFF") files, Audio Video Interleave (or ".AVI"), QuickTime (or ".MOV"), Moving Picture Experts Group (or ".MPG," ".MPEG" or ".MP4") or Windows Media Video (or ".WMV") files.

Reflected light may be captured or detected by an imaging device if the reflected light is within the device's field of view, which is defined as a function of a distance between a sensor and a lens within the device, viz., a focal length, as well as a location of the device and an angular orientation of the device's lens. Accordingly, where an object appears within a depth of field, or a distance within the field of view where the clarity and focus is sufficiently sharp, an imaging device may capture light that is reflected off objects of any kind to a sufficiently high degree of resolution using one or more sensors thereof, and store information regarding the reflected light in one or more data files.

Many imaging devices also include manual or automatic features for modifying their respective fields of view or orientations. For example, a digital camera may be configured in a fixed position, or with a fixed focal length (e.g., fixed-focus lenses) or angular orientation. Alternatively, an imaging device may include one or more actuated or motorized features for adjusting a position of the imaging device, or for adjusting either the focal length (e.g., a zoom level of the imaging device) or the angular orientation (e.g., the roll angle, the pitch angle or the yaw angle), by causing a change in the distance between the sensor and the lens (e.g., optical zoom lenses or digital zoom lenses), a change in the location of the imaging device, or a change in one or more of the angles defining the angular orientation.

For example, an imaging device may be hard-mounted to a support or mounting that maintains the device in a fixed configuration or angle with respect to one, two or three axes. Alternatively, however, an imaging device may be provided with one or more motors and/or controllers for manually or automatically operating one or more of the components, or for reorienting the axis or direction of the device, i.e., by panning or tilting the device. Panning an imaging device may cause a rotation within a horizontal plane or about a vertical axis (e.g., a yaw), while tilting an imaging device may cause a rotation within a vertical plane or about a horizontal axis (e.g., a pitch). Additionally, an imaging device may be rolled, or rotated about its axis of rotation, and within a plane that is perpendicular to the axis of rotation and substantially parallel to a field of view of the device.

Furthermore, some imaging devices may digitally or electronically adjust an image identified in a field of view, subject to one or more physical or operational constraints. For example, a digital camera may virtually stretch or condense the pixels of an image in order to focus or broaden the field of view of the digital camera, and also translate one or more portions of images within the field of view. Some imaging devices having optically adjustable focal lengths or axes of orientation are commonly referred to as pan-tilt-zoom (or "PTZ") imaging devices, while imaging devices having digitally or electronically adjustable zooming or translating features are commonly referred to as electronic PTZ (or "ePTZ") imaging devices.

Information and/or data regarding features or objects expressed in imaging data, including colors, textures or outlines of the features or objects, may be extracted from the data in any number of ways. For example, colors of image pixels, or of groups of image pixels, in a digital image may be determined and quantified according to one or more standards, e.g., the RGB color model, in which the portions of red, green or blue in an image pixel are expressed in three corresponding numbers ranging from 0 to 255 in value, or a hexadecimal model, in which a color of an image pixel is expressed in a six-character code, wherein each of the characters may have a range of sixteen. Colors may also be expressed according to a six-character hexadecimal model, or # NNNNNN, where each of the characters N has a range of sixteen digits (i.e., the numbers 0 through 9 and letters A through F). The first two characters NN of the hexadecimal model refer to the portion of red contained in the color, while the second two characters NN refer to the portion of green contained in the color, and the third two characters NN refer to the portion of blue contained in the color. For example, the colors white and black are expressed according to the hexadecimal model as # FFFFFF and #000000, respectively, while the color National Flag Blue is expressed as #3C3B6E. Any means or model for quantifying a color or color schema within an image or photograph may be utilized in accordance with the present disclosure. Moreover, textures or features of objects expressed in a digital image may be identified using one or more computer-based methods, such as by identifying changes in intensities within regions or sectors of the image, or by defining areas of an image corresponding to specific surfaces.

Furthermore, edges, contours, outlines, colors, textures, silhouettes, shapes or other characteristics of objects of any types, or portions of objects of such types, expressed in still or moving digital images may be identified using one or more algorithms or machine-learning tools. The objects or portions of objects may be stationary or in motion, and may be identified at single, finite periods of time, or over one or more periods or durations. Such algorithms or tools may be directed to recognizing and marking transitions (e.g., the edges, contours, outlines, colors, textures, silhouettes, shapes or other characteristics of objects or portions thereof) within the digital images as closely as possible, in a manner that minimizes noise and disruptions, and does not create false transitions. Some detection algorithms or techniques that may be utilized in order to recognize characteristics of objects or portions thereof in digital images in accordance with the present disclosure include, but are not limited to, Canny edge detectors or algorithms; Sobel operators, algorithms or filters; Kayyali operators; Roberts edge detection algorithms; Prewitt operators; Frei-Chen methods; or any other algorithms or techniques that may be known to those of ordinary skill in the pertinent arts. For example, objects or portions thereof expressed within imaging data may be associated with a label or labels according to one or more machine learning classifiers, algorithms or techniques, including but not limited to nearest neighbor methods or analyses, artificial neural networks, support vector machines, factorization methods or techniques, K-means clustering analyses or techniques, similarity measures such as log likelihood similarities or cosine similarities, latent Dirichlet allocations or other topic models, or latent semantic analyses.

Figure 2:
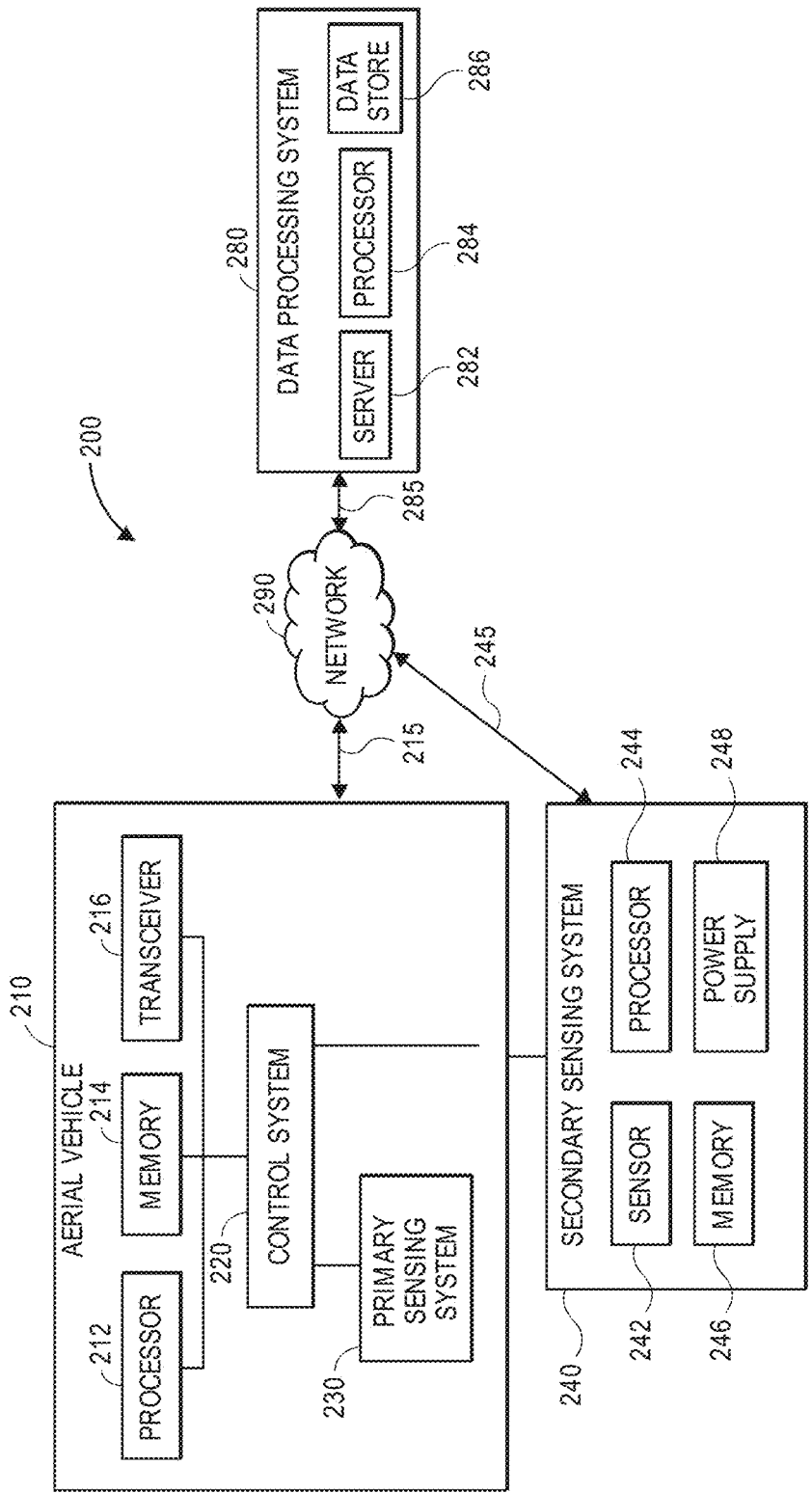
FIG. 2 is a block diagram of components of one system for annotating images based on multi-modal sensor data in accordance with embodiments of the present disclosure.

Referring to FIG. 2, a block diagram of components of one system 200 for annotating images based on multi-modal sensor data in accordance with embodiments of the present disclosure is shown. The system 200 includes an aerial vehicle 210 having a primary sensing system 230, as well as a secondary sensing system 240 and a data processing system 280 that are connected to one another across a network 290, such as the Internet. Except where otherwise noted, reference numerals preceded by the number "2" shown in FIG. 2 indicate components or features that are similar to components or features having reference numerals preceded by the number "1" shown in FIGS. 1A through 1H.

As is also shown in FIG. 2, the aerial vehicle 210 comprises a processor 212, a memory component 214 and a transceiver 216. Additionally, the aerial vehicle 210 may include any number of other components, including but not limited to control systems, inertial navigation systems, airframes, propulsion motors, propellers, control surfaces, item engagement systems, landing gear components, lighting systems, sensors, or others (not shown).

The processors 212 may be configured to perform any type or form of computing function. For example, the processors 212 may control any aspects of the operation of the aerial vehicle 210 and any computer-based components thereon, including but not limited to propulsion motors, propellers, control surfaces, item engagement systems, landing gear components, lighting systems, imaging devices or other operational or environmental sensors. For example, the processors 212 may control the operation of one or more control systems 220 or modules for generating instructions for conducting operations of the aerial vehicle 210, including but not limited to instructions for causing propulsion motors to operate at a predetermined or selected speed, for causing propellers to rotate at a predetermined or selected pitch or configuration, or for causing one or more sensors to capture information or data of any type or form. Similarly, the processors 212 may control the operation of one or more control surfaces (not shown), including but not limited to wings, rudders, ailerons, elevators, flaps, brakes, slats or other features. The processors 212 may communicate with the data processing system 280 or one or more other computer devices (not shown) over the network 290, through the sending and receiving of digital data, as indicated by the line 215.

The processors 212 may be a uniprocessor system including one processor, or a multiprocessor system including several processors (e.g., two, four, eight, or another suitable number), and may be capable of executing instructions. For example, in some embodiments, the processors 212 may be a general-purpose or embedded processor implementing any of a number of instruction set architectures (ISAs), such as the x86, PowerPC, SPARC, or MIPS ISAs, or any other suitable ISA. Where one or more of the processors 212 is a part of a multiprocessor system, each of the processors within the multiprocessor system may implement the same ISA, or different ISAs.

Additionally, the memory or storage components 214 (such as databases or data stores) are configured for storing any type of information or data, e.g., instructions for operating the aerial vehicle 210, or information or data captured during operations of the aerial vehicle 210, including but not limited to information or data captured by the primary sensing system 230 and/or the secondary sensing system 240. The memory components 214 may be configured to store executable instructions, flight paths, flight control parameters and/or other data items accessible by or to the processors 212. The memory components 214 may be implemented using any suitable memory technology, such as static random-access memory (SRAM), synchronous dynamic RAM (SDRAM), nonvolatile/Flash-type memory, or any other type of memory. In some embodiments, program instructions, flight paths, flight control parameters and/or other information or data items may be received or sent via the transceivers 216, e.g., by transmission media or signals, such as electrical, electromagnetic, or digital signals, which may be conveyed via a communication medium such as a wired and/or a wireless link.

The transceivers 216 may be configured to enable the aerial vehicle 210 to communicate using one or more wired or wireless systems or components, e.g., wired technologies such as Universal Serial Bus (or "USB") or fiber optic cable, or standard wireless protocols, such as over the network 290 or directly. In some embodiments, the transceivers 216 may be configured to transmit and receive electromagnetic signals, such as one or more radiofrequency signals, and may include one or more components configured to transmit such signals according to Bluetooth® or any Wireless Fidelity (or "Wi-Fi") protocol. In some embodiments, the transceivers 216 may be configured to transmit and receive light signals, and may include one or more light emitting diode (or "LED") transmitters and/or one or more optical sensors or receivers. In still other embodiments, the transceivers 216 may be configured to transmit and receive acoustic signals, and may include one or more devices having transducers for converting electrical signals into sound energy, e.g., speakers, or any other sound or vibration emitters, as well as one or more microphones, piezoelectric sensors, vibration sensors or other acoustic sensors. Such signals may be open and unencrypted, and captured and interpreted by any vehicle, station or object within a signal range of the transceivers 216, or subject to any form or level of encryption.

The transceivers 216 may further include or be in communication with one or more input/output (or "I/O") interfaces, network interfaces and/or input/output devices, and may be configured to allow information or data to be exchanged between one or more of the components of the aerial vehicle 210, or to one or more other computer devices or systems via the network 290. For example, in some embodiments, the transceivers 216 may be configured to coordinate I/O traffic between the processors 212 and one or more onboard or external computer devices or components. The transceivers 216 may perform any necessary protocol, timing or other data transformations in order to convert data signals from a first format suitable for use by one component into a second format suitable for use by another component. In some embodiments, the transceivers 216 may include support for devices attached through various types of peripheral buses, e.g., variants of the Peripheral Component Interconnect (PCI) bus standard or the Universal Serial Bus (USB) standard. In some other embodiments, functions of the transceivers 216 may be split into two or more separate components, or integrated with the processors 212. Although the transceiver 216 is shown in FIG. 2 as a single component for transmitting and/or receiving information or data, those of ordinary skill in the pertinent arts will recognize that the aerial vehicle 210 may include any number of transceivers 216, or, alternatively or additionally, any number of other transmitting and/or receiving devices that may be provided as discrete components.

As is discussed above, the aerial vehicle 210 may further include one or more control systems having one or more electronic speed controls, power supplies, navigation systems and/or payload engagement controllers for controlling the operation of the aerial vehicle 210 and for engaging with or releasing items (not shown), as desired. For example, such control systems 220 may be configured to cause or control the operation of one or more of propulsion motors, propellers, sensors or other aspects of the aerial vehicle 210, such as to cause one or more of propulsion motors to rotate propellers at a desired speed, in order to guide the aerial vehicle 210 along a determined or desired flight path, or to perform any other function. Such control systems may also be configured to cause or control the operation of one or more sensors, e.g., the primary sensing system 230 and/or the secondary sensing system 240. Such control systems may further control other aspects of the aerial vehicle 210, including but not limited to the operation of one or more control surfaces (not shown) such as wings, rudders, ailerons, elevators, flaps, brakes, slats or other features within desired operating ranges, or the enactment with or release of one or more items by one or more engagement systems (not shown). In some embodiments, the control system 220 may be integrated with one or more of the processors 212, the memory components 214 and/or the transceivers 216.

As is discussed above, in some embodiments, the aerial vehicle 210 may include one or more propulsion motors (e.g., electric, gasoline-powered or any other motor) joined to an airframe and capable of generating sufficient rotational speeds of corresponding propellers or other components to provide lift and/or thrust forces to the aerial vehicle 210 and any payload engaged thereby, such as to aerially transport the engaged payload from one location to another. For example, one or more of such propulsion motors may be a brushless direct current (DC) motor such as an outrunner brushless motor or an inrunner brushless motor. Additionally, the propulsion motors of the aerial vehicle 210 may be of any kind, and may be dedicated to one or more purposes or functions. For example, one or more of the propulsion motors may be aligned or configured to provide forces of lift to the aerial vehicle 210, exclusively, while one or more of the propulsion motors may be aligned or configured to provide forces of thrust to the aerial vehicle 210, exclusively. Alternatively, one or more of the propulsion motors may be aligned or configured to provide forces of lift and/or forces of thrust to the aerial vehicle 210, as needed. For example, such propulsion motors may be fixed in their orientation on the aerial vehicle 210, or configured to vary their respective orientations, e.g., a tilt-rotor aircraft. Moreover, such propulsion motors may be aligned or configured to operate with different capacities or ratings, or at different speeds, or coupled to propellers having different sizes and shapes. Such propulsion motors may be controlled by the processors 212, the control system 220, or any other aspect of the aerial vehicle 210.

Additionally, the propulsion motors of the aerial vehicle 210 may be coupled to one or more propellers, e.g., any rotors or rotatable systems having a plurality of shaped blades joined to a hub or boss. Each of such propellers may be rotatably mounted to a mast or drive shaft associated with a corresponding one of the propulsion motors and configured to generate forces of thrust when rotated within a fluid. Each of such propellers may also include any number of blades, and may be fixed pitch, adjustable pitch or variable pitch in nature. Moreover, one or more of the propellers may be banded or shielded in any manner. In some embodiments, one or more of the propellers may be configured to rotate about a vertical axis, and to provide forces of thrust in a vertical direction (e.g., upward) accordingly. In some other embodiments, one or more of the propellers may be configured to rotate about a horizontal axis, and to provide forces of thrust in a horizontal direction (e.g., forward) accordingly. In still other embodiments, one or more of the propellers may be configured to rotate about axes that are neither horizontal nor vertical, and to provide forces of thrust in directions corresponding to such axes accordingly. Such propellers may be controlled by the processors 212, any number of control systems associated therewith, or any other aspect of the aerial vehicle 210.

The aerial vehicle 210 may also include one or more inertial navigation systems (or inertial measurement units) (not shown), which may be any type or form of device for sensing changes in linear or rotational motion of the aerial vehicle 210, or for interpreting such changes in order to maintain the aerial vehicle 210 on a desired course, at a desired speed, or at a desired altitude, or to effectuate any desired changes in course, speed or altitude Such inertial navigation systems may include one or more gyroscopes, one or more accelerometers, one or more compasses (or other magnetometers) and/or one or more Global Positioning System ("GPS") transceivers (not shown).

The primary sensing system 230 may include any type or form of sensor for capturing information or data in one or more modalities during the operation of the aerial vehicle 210. For example, the primary sensing system 230 may include one or more imaging devices or any other form of optical recording device that may be used to photograph or otherwise record imaging data, including but not limited to digital cameras (e.g., an RGB color camera, a still camera, a motion capture/video camera or any other type or form of camera for capturing color, grayscale and/or black-and-white images), depth sensors, range cameras, thermal imaging cameras (e.g., infrared cameras), radiographic cameras, ultraviolet cameras, radar sensors or laser sensors, and any associated memory or storage components and processors, as well as one or more photosensitive surfaces, filters, chips, electrodes, clocks, boards, timers or any other relevant features (not shown). Where the primary sensing system 230 is configured to capture imaging data, the imaging data may be stored in any variety of formats including, but not limited to, YUYV, RGB, RAW, .BMP, .JPEG, .GIF, or the like.

In some embodiments, the sensors of the primary sensing system 230 may be hard-mounted to or embedded within one or more surfaces of the aerial vehicle 210 in a manner that maintains the sensors in a fixed configuration or angle with respect to one, two or three axes. Alternatively, however, one or more of the sensors of the primary sensing system 230 may be provided with one or more motors and/or controllers for manually or automatically operating one or more of the components, or for reorienting an axis or direction of the sensors, i.e., by panning or tilting the sensors. Panning a sensor may cause a rotation within a horizontal axis or about a vertical axis (e.g., a yaw), while tilting a sensor may cause a rotation within a vertical plane or about a horizontal axis (e.g., a pitch). Additionally, a sensor may be rolled, or rotated about its axis of rotation, and within a plane that is perpendicular to the axis of rotation and substantially parallel to a field of view of the sensor.

The primary sensing system 230 may also include one or more acoustic sensors, or components or features for detecting and capturing sound energy in a vicinity of the aerial vehicle 210. Such acoustic sensors may include one or more microphones (e.g., transducers such as a dynamic microphone, a condenser microphone, a ribbon microphone, a crystal microphone) that are configured to convert acoustic energy of any intensity and across any or all frequencies into one or more electrical signals, and may include any number of diaphragms, magnets, coils, plates, or other like features for detecting and recording such energy. Such microphones may also be provided as a discrete component, or in combination with one or more other components, e.g., an imaging device such as a digital camera, and may be configured to detect and record acoustic energy from any and all directions. Such acoustic sensors may further include one or more piezoelectric sensors that are configured to convert changes in pressure, including but not limited to such pressure changes that are initiated by the presence of acoustic energy across various bands of frequencies, to electrical signals, and may include one or more crystals, electrodes or other features, as well as one or more vibration sensors.

The primary sensing system 230 may further include one or more environmental or operational sensors such as one or more air monitoring sensors (e.g., oxygen, ozone, hydrogen, carbon monoxide or carbon dioxide sensors), infrared sensors, ozone monitors, pH sensors, magnetic anomaly detectors, metal detectors, radiation sensors (e.g., Geiger counters, neutron detectors, alpha detectors), attitude indicators, depth gauges, accelerometers or the like. Additionally, the sensors of the primary sensing system 230 may be mounted in any specific location or orientation with respect to the aerial vehicle 210, e.g., above, below or alongside one or more airframes, propulsion motors, propellers, control surfaces or other systems (not shown).

The secondary sensing system 240 shown in FIG. 2 may be provided as a free-standing, independent unit, and includes a sensor 242, a processor 244, a memory component 246 and a power supply 248. The secondary sensing system 240 may be affixed, mounted, applied, adhered or otherwise associated with the aerial vehicle 210 and operated to capture data, by way of the sensor 242, during the capture of data by way of the primary sensing system 230.

The sensor 242 may be any type or form of sensor for capturing information or data in one or more modalities during the operation of the aerial vehicle 210. As is discussed above with regard to the primary sensing system 230, the sensor 242 may be any type or form of imaging device, acoustic sensors, environmental sensors, operational sensors, including but not limited to the one or more sensors described above with regard to the primary sensing system 230. Additionally, the processor 244 may be any computer devices or systems for controlling the operations of the secondary sensing system 240, and the memory component 246 may be any devices or components configured for storing any type of information or data, e.g., information or data captured by the sensor 242. For example, the processor 244 and the memory component 246 may include, but are not limited to, one or more of the processors or memory components described above with regard to the processor 212 or the memory component 214 of the aerial vehicle 210. In some embodiments, the secondary sensing system 240 may be configured to communicate with the aerial vehicle 210 and/or the data processing system 280, or one or more other computer devices (not shown) over the network 290, through the sending and receiving of digital data, as indicated by the line 245.

The power supply (or power module) 248 may be any type of power source for providing electrical power or other forms of power in support of one or more electrical loads associated with the secondary sensing system 240. In some embodiments, the power supply 248 may include one or more batteries or other power cells, e.g., dry cell or wet cell batteries such as lead-acid batteries, lithium ion batteries, nickel cadmium batteries or nickel metal hydride batteries, or any other type, size or form of batteries. The power supply 248 may each have any cell voltages, peak load currents, charge times, specific energies, internal resistances or cycle lives, or other power ratings. The power supply 248 may also be any type, size or form of other power source, e.g., other than a battery, including but not limited to one or more fuel cells, turbines, solar cells or nuclear reactors. Alternatively, the power supply 248 may be another form of prime mover (e.g., electric, gasoline-powered or any other type of motor) capable of generating sufficient mechanical forces for the secondary sensing system 240.

Those of ordinary skill in the pertinent arts will recognize that the secondary sensing system 240 and/or the sensor 242 may be provided in a housing, structure, frame or component that is physically separate and distinct from a housing, structure, frame or component of the aerial vehicle 210, such as is shown in FIG. 2. In such embodiments, the secondary sensing system 240 may be physically coupled to the aerial vehicle 210 prior to capturing data synchronously or nearly synchronously with both the primary sensing system 230 and the secondary sensing system 240, and uncoupled from the aerial vehicle 210 after the data has been captured by each of the systems 230, 240. Alternatively, in some embodiments, the secondary sensing system 240 and/or the sensor 242 may be incorporated or integrated into the aerial vehicle 210, such as is shown in FIG. 1A. In such embodiments, the secondary sensing system 240 and/or the sensor 242 need not include one or more of the processor 244, the memory component 246 or the power supply 248, and may instead rely on, share or utilize the processor 212, the memory component 214 and/or any power supplies (not shown) of the aerial vehicle 210.

The data processing system 280 includes a networked computer infrastructure for performing various computer-related functions associated with the receipt, storage and processing of data by the primary sensing system 230 or the secondary sensing system 240, including one or more physical computer servers 282 having one or more computer processors 284 and any number of data stores 286 (e.g., databases) associated therewith, which may be provided for any specific or general purpose. For example, in some embodiments, the servers 282, the processors 284 and/or the data stores 286 of the data processing system 280 may be provided for the purpose of training one or more machine learning algorithms, systems or techniques to detect one or more objects of interest within data captured by the primary sensing system 230 and/or the secondary sensing system 240, e.g., using a training set of data and annotations of locations of such objects of interest therein. The servers 282, the processors 284 and/or the data stores 286 of the data processing system 280 may also be provided for the purpose of detecting one or more objects of interest within data captured by the primary sensing system 230 and/or the secondary sensing system 240, e.g., by providing such data to a trained machine learning system as inputs, and receiving information regarding locations of such objects within such data as outputs.

Additionally, in some embodiments, the data processing system 280 of FIG. 2 may be independently provided for the exclusive purpose of receiving, analyzing or storing information or data (e.g., imaging data of any type or form, as well as annotations of such data) captured by the primary sensing system 230, the secondary sensing system 240, or any other sensors or sensing systems associated with the aerial vehicle 210, as well as any number of other sensors that may operate in different modalities. Alternatively, the data processing system 280 of FIG. 2 may be provided in connection with one or more other physical or virtual services configured to receive, analyze or store such information or data, as well as one or more other functions.

The servers 282 may be connected to or otherwise communicate with the processors 284 and the data stores 286, which may store any type of information or data, for any purpose. The servers 282 and/or the computer processors 284 may also connect to or otherwise communicate with the network 290, as indicated by line 285, through the sending and receiving of digital data. For example, the data processing system 280 may include any facilities, stations or locations having the ability or capacity to receive and store information or data, e.g., imaging data, acoustic signals or energy, or related information or data received from the aerial vehicle 210, or from one another, or from one or more other external computer systems (not shown) via the network 290. In some embodiments, the data processing system 280 may be provided in a physical location, e.g., in a location from which the aerial vehicle 210 has departed, to which the aerial vehicle 210 may be headed, or at which the aerial vehicle 210 is typically housed, based or stored. In other such embodiments, the data processing system 280 may be provided in one or more alternate or virtual locations, e.g., in a "cloud"-based environment. In still other embodiments, one or more components of the data processing system 280 may be provided onboard one or more aerial vehicles, including but not limited to the aerial vehicle 210.

The network 290 may be any wired network, wireless network, or combination thereof, and may comprise the Internet in whole or in part. In addition, the network 290 may be a personal area network, local area network, wide area network, cable network, satellite network, cellular telephone network, or combination thereof. The network 290 may also be a publicly accessible network of linked networks, possibly operated by various distinct parties, such as the Internet. In some embodiments, the network 290 may be a private or semi-private network, such as a corporate or university intranet. The network 290 may include one or more wireless networks, such as a Global System for Mobile Communications (GSM) network, a Code Division Multiple Access (CDMA) network, a Long-Term Evolution (LTE) network, or some other type of wireless network. Protocols and components for communicating via the Internet or any of the other aforementioned types of communication networks are well known to those skilled in the art of computer communications and thus, need not be described in more detail herein.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

The aerial vehicle 210 and/or the data processing system 280 may use any web-enabled or Internet applications or features, or any other client-server applications or features including E-mail or other messaging techniques, to connect to the network 290, or to communicate with one another, such as through short or multimedia messaging service (SMS or MMS) text messages. For example, the aerial vehicle 210 may be adapted to transmit information or data in the form of synchronous or asynchronous messages to the data processing system 280 or to any other computer device (e.g., to one or more other aerial vehicles) in real time or in near-real time, or in one or more offline processes, via the network 290. Those of ordinary skill in the pertinent art would recognize that the aerial vehicle 210 or the data processing system 280 may operate or be operated by any of a number of computing devices that are capable of communicating over the network, including but not limited to set-top boxes, personal digital assistants, digital media players, web pads, laptop computers, desktop computers, electronic book readers, and the like. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as the processors 212, the processor 244 or the processor 284, or any other computers or control systems utilized by the aerial vehicle 210 or the data processing system 280 (e.g., by one or more other aerial vehicles), and having sequences of instructions which, when executed by a processor (e.g., a central processing unit, or "CPU"), cause the processor to perform all or a portion of the functions, services and/or methods described herein. Such computer executable instructions, programs, software, and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage media of the present disclosure may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer-executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

The present disclosure references a number of computer-based functions or tasks that may be executed by one or more computer processors, systems or resources. In some embodiments, each of such functions or tasks may be executed by processors associated with a primary sensor (e.g., an imaging device or any other type or form of sensor) which may control one or more aspects of the capture, processing and/or storage of imaging data. In some other embodiments, each of such functions or tasks may be executed by processors that are external to an imaging device, such as in one or more other physical, alternate or virtual locations, e.g., in a "cloud"-based environment. In still other embodiments, such functions or tasks may be executed in a distributed manner, such as by computer processors, systems or resources in two or more distributed locations. For example, some of such functions or tasks may be executed by processors associated with one or more aerial vehicles and/or sensors, while other functions or tasks may be executed by processors located in one or more other physical, alternate or virtual locations.

Figure 3:
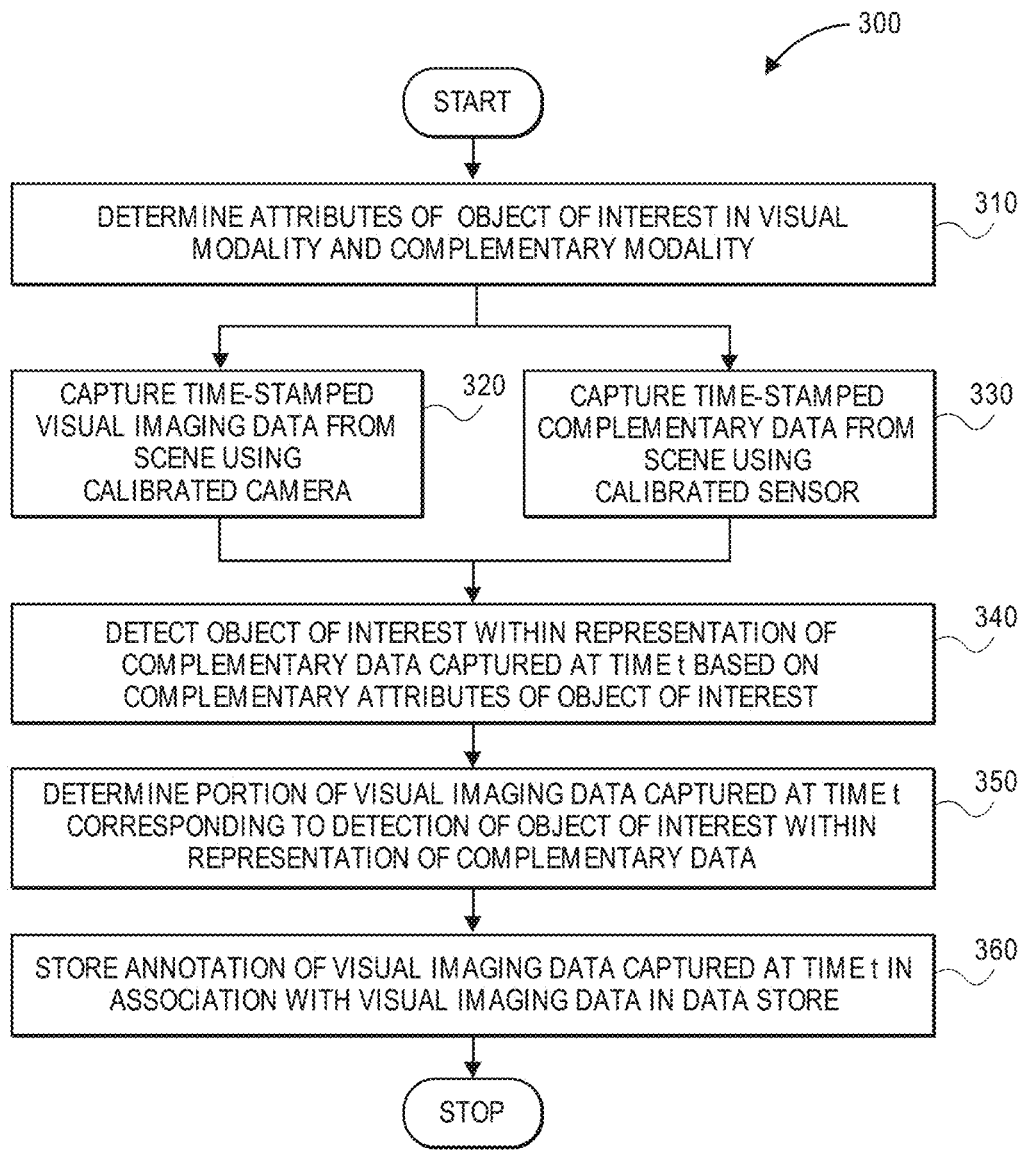
FIG. 3 is a flow chart of one process for annotating images based on multi-modal sensor data in accordance with embodiments of the present disclosure.

As is discussed above, some embodiments of the present disclosure may be used to confirm a detection of an object of interest within data captured by a sensor operating in one modality, e.g., imaging data captured by an imaging device, using data captured by sensors operating in multiple modalities. Referring to FIG. 3, a flow chart 300 of one process for annotating images based on multi-modal sensor data in accordance with embodiments of the present disclosure is shown. At box 310, attributes of an object of interest within a visual modality (e.g., color, grayscale or black-and-white) and a complementary modality of a complementary sensor are determined. The visual attributes may relate to any edges, contours, outlines, colors, textures, silhouettes, shapes or other characteristics of the object of interest, while the attributes of the object within the complementary modality relate to features or characteristics of that modality. For example, where a complementary modality relates to heat and/or temperature, the attributes of the object within that modality may describe the emission of heat or other infrared radiation from surfaces of the object, including internal or external temperature localities or gradients of the object, or any other thermal features of the object, e.g., temporal or spatial variations in temperature or emitted heat, and any sources of heating or cooling of the object. Where a complementary modality relates to radiation, the attributes of the object within that modality may describe the types or forms of energy radiated therefrom, e.g., alpha particles, beta particles, gamma rays, or any other atoms, ions or subatomic particles. The attributes of the object within a given modality may be described or represented as a signature, a profile, or any other form, and in any qualitative or quantitative manner, e.g., using imagery, text, numbers, variables or the like.

At box 320, time-stamped imaging data is captured from a scene using a calibrated camera, and in parallel, at box 330, time-stamped complementary data is captured from the scene using a calibrated sensor. The camera and the sensor are calibrated geometrically, such that mappings between coordinate pairs of data captured by the camera and the sensor, and directions relative to the camera and the sensor, are known, or easily determined. Furthermore, because the data captured by the camera and the sensor is time-stamped, the data may be used to determine the status of the scene with respect to the respective modalities (e.g., a visual modality, and the complementary modality) at synchronized times, or nearly synchronized times.

At box 340, the object of interest is detected within a representation of the complementary data captured at time t, based on the attributes of the object of interest within the modality of the complementary sensor. For example, where the object of interest is a human, and where the attributes of the object of interest include a heat signature (or an infrared signature) of humans, indicating an anticipated internal or surface temperature of a human, from which expected temperature differences between humans and background or foreground objects, which may be expected to have ambient temperatures, or other temperatures, may be derived. Thus, when one or more portions of a representation of the complementary data, e.g., a thermal image, are consistent with the heat signature of a human, such portions may be presumed to depict one or more humans, to varying degrees of confidence. Similarly, where the object of interest is an operating mobile telephone or other cellular-equipped device, and the attributes of the object may include a signature or profile depicting portions of the mobile telephone that emit radiofrequency waves at selected frequencies, e.g., four hundred fifty to two thousand megahertz (450-2000 MHz). Thus, when one or more portions of a representation of the complementary data, e.g., a radiographic image, are consistent with the radiofrequency signature or profile of a mobile device, such portions may be presumed to depict one or more mobile devices, to varying degrees of confidence.

At box 350, a portion of the imaging data that was captured at time t corresponding to the detection of the object of interest within the representation of the complementary data captured at time t is determined. As is discussed above, because the camera and the sensor are calibrated, a detection of the object of interest within data captured by the sensor may be transposed to data captured by the camera at the same time, or vice versa. Thus, portions of the complementary data captured at time t from which the object of interest was detected may be used to identify a corresponding portion of the imaging data captured by the camera at time t. Once the object has been detected based on the complementary data, e.g., heat, radiography, ultraviolet light, or any other sensor data, characteristics or the object or portions thereof within the complementary data may be matched against information regarding edges, contours, outlines, colors, textures, silhouettes, shapes or other characteristics of the object appearing within the imaging data. Alternatively, in some embodiments, one or more object detection algorithms or techniques may be performed on the imaging data or a portion thereof, e.g., the portion of the imaging data corresponding to the detection of the object within the complementary data, separately or in parallel with the detection of the object within the representation of the complementary data at box 340. Outputs of such object detection algorithms or techniques may be compared to the portions of the imaging data or complementary data, as appropriate.

At box 360, an annotation of the imaging data captured at time t is stored in association with the imaging data in one or more data stores, and the process ends. The annotation may include coordinate pairs or other identifiers of pixels of interest corresponding to a box (or, alternatively, another polygon or other shape) including a portion of the imaging data that corresponds to the object of interest. The annotation may be stored in association with an image or a video file, e.g., in a record maintained separately from the image or the video file, or in metadata of the image or the video file, or in any other manner.

As is discussed above, where two or more sensors that operate in different modalities are calibrated, data captured simultaneously by one of the sensors in one of the modalities may be correlated with data captured simultaneously by one or more other sensors operating in one or more other modalities. In this regard, where an object is detected within data captured by one of the sensors operating in one modality, e.g., based on attributes of the object in that modality, corresponding portions of the data captured by another of the sensors operating in a different modality may be evaluated to determine whether such portions depict attributes of the object in the other modality, thereby enhancing the likelihood that the object is properly detected in each of the respective modalities.

Figure 4A:
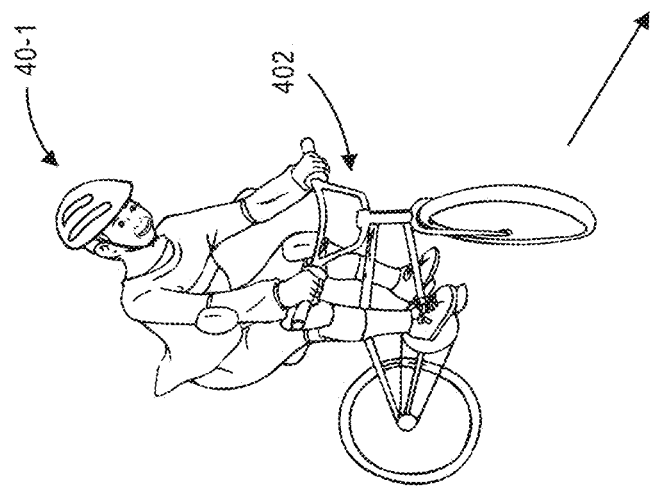
FIGS. 4A and 4B are views of aspects of one system for annotating images based on multi-modal sensor data in accordance with embodiments of the present disclosure.
Figure 4A:
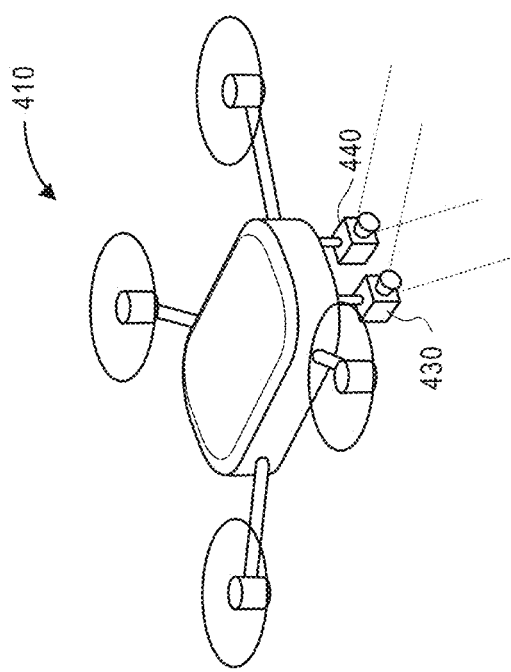
Figure 4B:
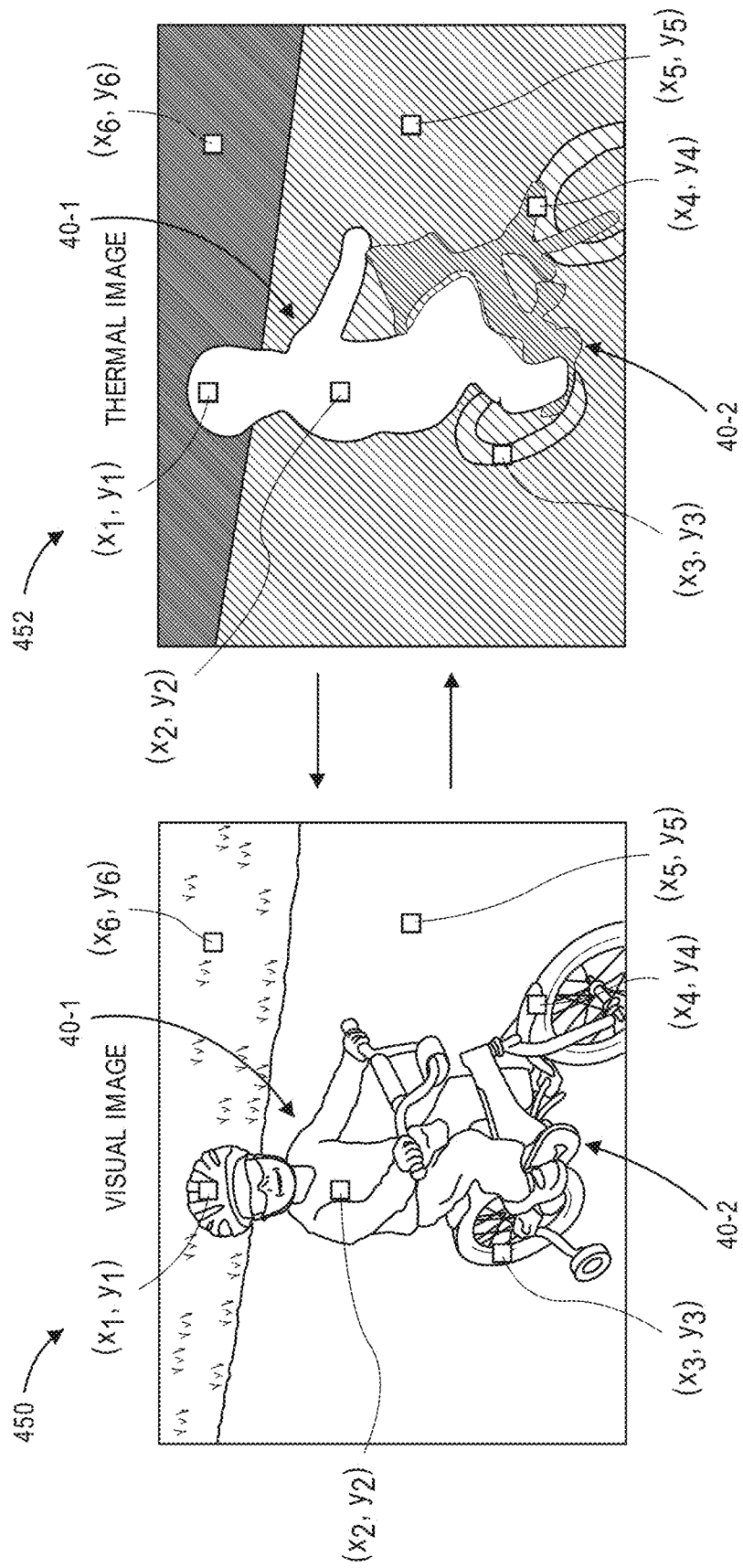

Referring to FIGS. 4A and 4B, views of aspects of one system for annotating images based on multi-modal sensor data in accordance with embodiments of the present disclosure are shown. Except where otherwise noted, reference numerals preceded by the number "4" shown in FIGS. 4A and 4B indicate components or features that are similar to components or features having reference numerals preceded by the number "2" shown in FIG. 2 or by the number "1" shown in FIGS. 1A through 1H.

As is shown in FIG. 4A, an aerial vehicle 410 includes a visual imaging device 430 and a thermal imaging device 440 (or another secondary sensor), along with one or more propulsion motors, control surfaces, frames, appurtenances or other components. The visual imaging device 430 and the thermal imaging device 440 are aligned to capture data forward of the aerial vehicle 410 as the aerial vehicle 410 operates within a scene. For example, as is shown in FIG. 4A, an actor 40-1 (e.g., a human) operates a machine 40-2 (e.g., a bicycle) on the scene, within the fields of view of the imaging devices 430, 440.

As is shown in FIG. 4B, where one or more attributes of an object of interest are detected to a predetermined level of confidence within one portion of a visual image 450-1 captured using the visual imaging device 430, a corresponding portion of a thermal image 450-2 captured using the thermal imaging device 440 may be evaluated to determine whether one or more attributes of the object of interest are detected therein. Because the visual imaging device 430 and the thermal imaging device 440 are calibrated, mappings between coordinate pairs of the visual image 450-1 and the thermal image 450-2 are known, or easily determined. Therefore, a probability that a candidate detection in the visual image 450-1 is an object of interest may be enhanced based on the probability that a candidate detection in the thermal image is also the object of interest.

For example, as is shown in FIG. 4B, where a detection of an object of interest (viz., a bicycle helmet) is identified at a point $(x_1, y_1)$ within the visual image 450-1, e.g., based on any visual attributes such as edges, contours, outlines, colors, textures, silhouettes, shapes or other characteristics of the object depicted therein, the corresponding point $(x_1, y_1)$ within the thermal image 450-2 may be evaluated to determine whether the corresponding point $(x_1, y_1)$ is consistent with the object of interest. Whether the contents of the visual image 450-1 at the point $(x_1, y_1)$ are consistent with the contents of the thermal image 450-2 at the corresponding point $(x_1, y_1)$ may be determined on any qualitative or quantitative basis. For example, because the thermal image 450-2 indicates a strong temperature contrast at the corresponding point $(x_1, y_1)$, as compared to background features of the thermal image 450-2, the corresponding point $(x_1, y_1)$ of the thermal image 450-2 may be reasonably assumed to be considerably warmer than ambient temperature or the background features within the thermal image 450-2, and possibly corresponding to a human. Since the object of interest is intended for wearing about a human head, the probability that the visual image 450-1 depicts the object of interest at the point $(x_1, y_1)$ may be enhanced accordingly, based on a contrast in temperatures determined at the point $(x_1, y_1)$ in the thermal image 450-2. Alternatively, the thermal image 450-2 may be evaluated to arrive at a quantitative value for a temperature at the corresponding point $(x_1, y_1)$. To the extent that the thermal image 450-2 depicts a normal body temperature at the corresponding point ($x_1$, $y_1$), the probability that the visual image 450-1 depicts the object of interest at the point ($x_1$, $y_1$) may be further enhanced.

Similarly, where a detection of an object of interest (viz., a human, or an article of clothing worn by a human) is identified at a point ($x_2$, $y_2$) within the visual image 450-1, a corresponding point ($x_2$, $y_2$) within the thermal image 450-2 may be evaluated to determine whether the corresponding point ($x_2$, $y_2$) is consistent with the object of interest. Where the thermal image 450-2 indicates a sufficiently warm contrast between the corresponding point ($x_2$, $y_2$) and its surroundings, or where a temperature consistent with a normal body temperature is derived from the thermal image 450-2 at the corresponding point ($x_2$, $y_2$), the probability that the visual image 450-1 depicts the object of interest at the point ($x_2$, $y_2$) may be further enhanced.

Likewise, where detections of objects of interest, viz., a bicycle tire, a bicycle frame, a traveling surface and regional flora, are identified at points ($x_3$, $y_3$), ($x_4$, $y_4$), ($x_5$, $y_5$), ($x_6$, $y_6$), respectively, of the visual image 450-1, the corresponding points ($x_3$, $y_3$), ($x_4$, $y_4$), ($x_5$, $y_5$), ($x_6$, $y_6$) within the thermal image 450-2 may be evaluated to determine whether the corresponding points ($x_3$, $y_3$), ($x_4$, $y_4$), ($x_5$, $y_5$), ($x_6$, $y_6$) are consistent with the detected object of interest. The objects of interest may be detected at the points ($x_3$, $y_3$), ($x_4$, $y_4$), ($x_5$, $y_5$), ($x_6$, $y_6$) of the visual image 450-1 on any basis, e.g., based on visual attributes such as edges, contours, outlines, colors, textures, silhouettes, shapes or other characteristics of such objects. Likewise, whether the corresponding points ($x_3$, $y_3$), ($x_4$, $y_4$), ($x_5$, $y_5$), ($x_6$, $y_6$) of the thermal image 450-2 depict the same objects of interest may be determined based on attributes of such objects in the modality of the thermal imaging device 440, e.g., heat or thermal properties of such objects. If the portions of the visual image 450-1 at the points ($x_3$, $y_3$), ($x_4$, $y_4$), ($x_5$, $y_5$), ($x_6$, $y_6$) correspond to the portions of the thermal image 450-2 at the corresponding points ($x_3$, $y_3$), ($x_4$, $y_4$), ($x_5$, $y_5$), ($x_6$, $y_6$), the probabilities that the visual image 450-1 depicts the objects of interest may be enhanced accordingly.

Those of ordinary skill in the pertinent arts will recognize that data captured by any type of sensor operating in any modality may be correlated with data captured by any other type of sensor operating in any other modality. For example, referring again to FIG. 4B, an initial detection of an object of interest may be made within the thermal image 450-2, e.g., an article of clothing, a human, a bicycle tire, a bicycle frame, a traveling surface and regional flora at the points ($x_1$, $y_1$), ($x_2$, $y_2$), ($x_3$, $y_3$), ($x_4$, $y_4$), ($x_5$, $y_5$), ($x_6$, $y_6$) of the thermal image 450-2, respectively, and corresponding portions of the visual image 450-1 may be evaluated to determine whether such corresponding portions likewise depicts one or more attributes of the same object. Where an object of interest is confirmed to have been detected within data in one modality (e.g., either visual imaging data such as the visual image 450-1 of FIG. 4B, or thermal imaging data such as the thermal image 450-2 of FIG. 4B) to a sufficiently high degree of confidence, data in another modality may be annotated to reflect locations of the data corresponding to the object of interest, and utilized for any purpose.

An object may be detected within any modality based on any attributes that may correspond to the modality, and may be recognized within data captured by one or more sensors operating in the modality. Referring to FIGS. 5A-5D, views of aspects of one system for annotating images based on multi-modal sensor data in accordance with embodiments of the present disclosure are shown. Except where otherwise noted, reference numerals preceded by the number "5" shown in FIGS. 5A through 5D indicate components or features that are similar to components or features having reference numerals preceded by the number "4" shown in FIGS. 4A and 4B, by the number "2" shown in FIG. 2 or by the number "1" shown in FIGS. 1A through 1H.

Figure 5A:
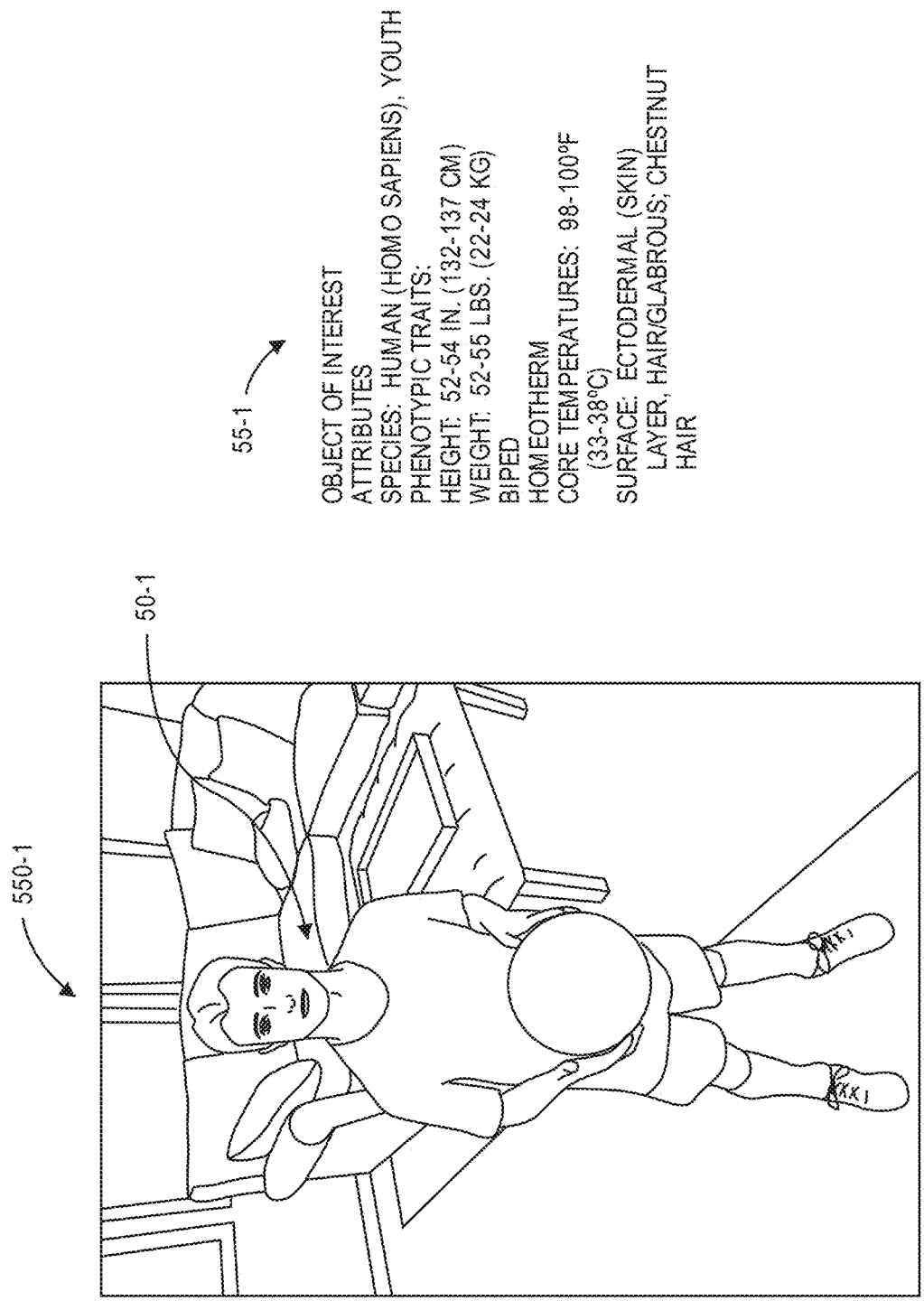
FIGS. 5A through 5D are views of aspects of one system for annotating images based on multi-modal sensor data in accordance with embodiments of the present disclosure.
Figure 5B:
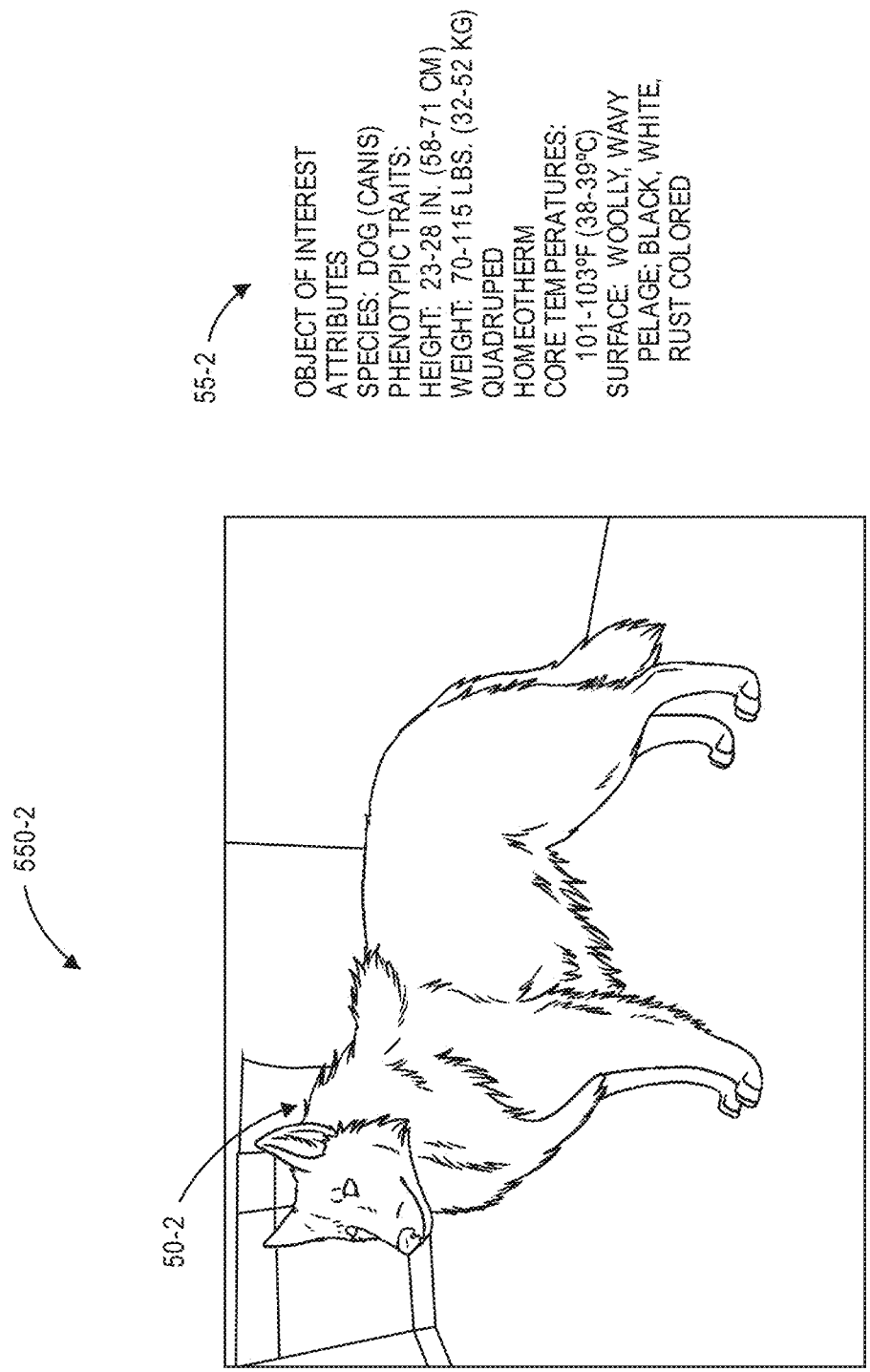
Figure 5C:
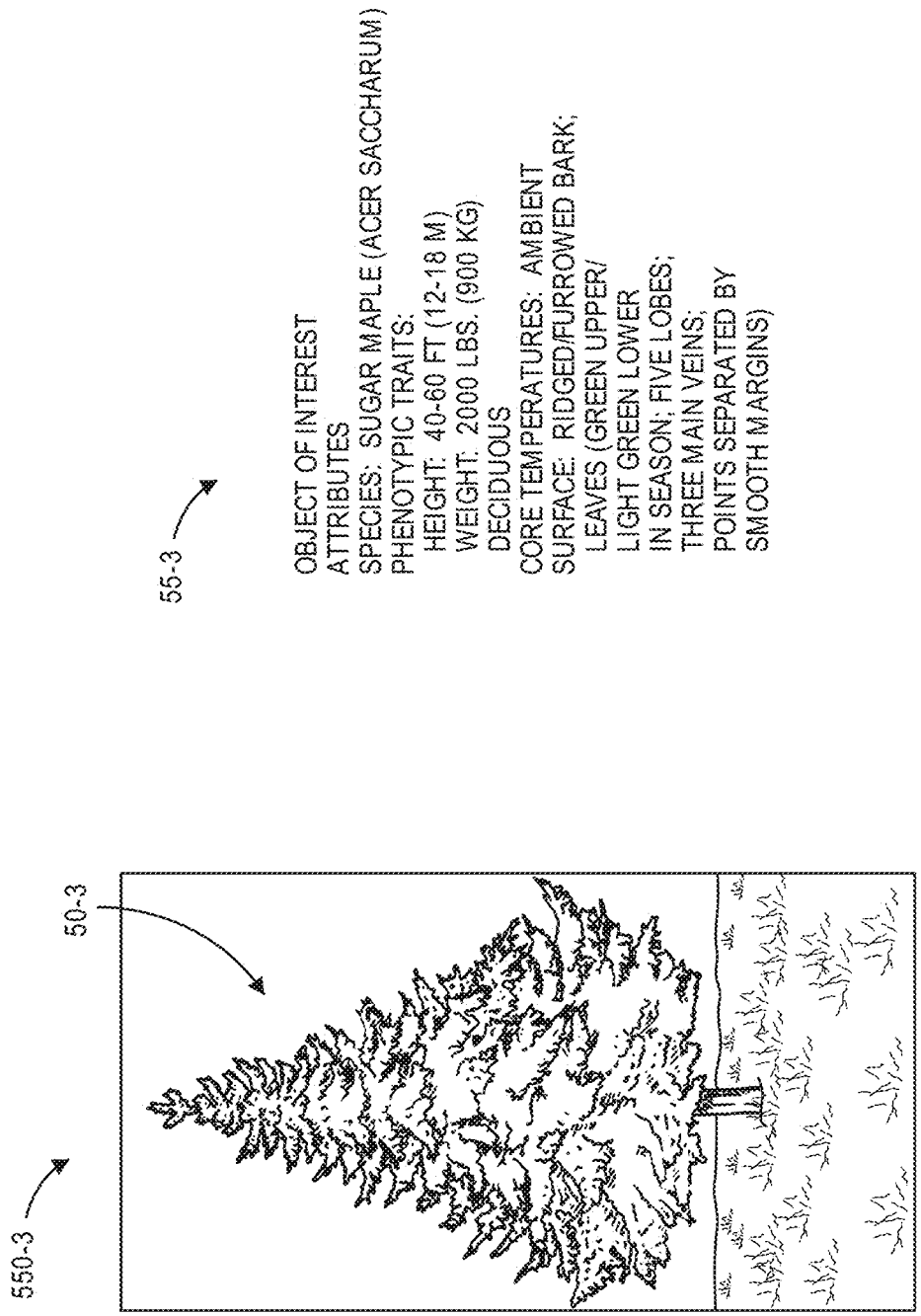

As is shown in FIGS. 5A, 5B, and 5C, attributes of objects of interest of any type may be determined and used to train one or more object detection algorithms for respective modalities to recognize the objects of interest of the type within data captured within such modalities. For example, as is shown in FIG. 5A, a visual image 550-1 depicts an object of interest 50-1 (viz., a boy). A plurality of attributes 55-1 of the object of interest 50-1 may be identified. For example, the attributes 55-1 identify a species of the object of interest 50-1 (viz., a *Homo sapiens*, or a human), as well as phenotypic traits of the object of interest 50-1, including dimensions such as heights and weights of the object of interest 50-1. Additionally, the attributes 55-1 further identify the object of interest 50-1 as a biped, or two-legged, and a homeotherm having an average core temperature of ninety-eight to one hundred degrees Fahrenheit (98-100° F.), or thirty-three to thirty-eight degrees Celsius (33-38° C.). The attributes 55-1 also include visual attributes of the object of interest 50-1, including features of skin (e.g., that the skin is both hairy and glabrous) and hair (e.g., that the hair is chestnut-colored) of the object of interest 50-1.

Similarly, as is shown in FIG. 5B, a visual image 550-2 depicts an object of interest 50-2 (viz., a dog), and a plurality of attributes 55-2 of the object of interest 50-2 may be identified, such as a species of the object of interest 50-2 (viz., a *Canis*, or dog), phenotypic traits of the object of interest 50-2 (e.g., heights and weights), and also that the object of interest 50-2 is a quadruped, or four-legged, and a homeotherm with a specific average core temperature. Moreover, the attributes 55-2 further include visual attributes of the object of interest 50-2, including features of a coat of fur of the object of interest 50-2. Likewise, as is shown in FIG. 5C, a visual image 550-3 depicts an object of interest 50-3 (viz., a tree), and a plurality of attributes 55-3 of the object of interest 50-3 may be identified, such as a species of the object of interest (viz., an *Acer saccharum*, or a sugar maple), phenotypic traits of the object of interest 50-3, such as average heights and weights of the object of interest 50-3, and that the object of interest 50-3 is deciduous. The attributes 55-3 also include visual attributes of the object of interest 50-3, namely, features of bark and leaves of the object of interest 50-3.

Figure 5D:
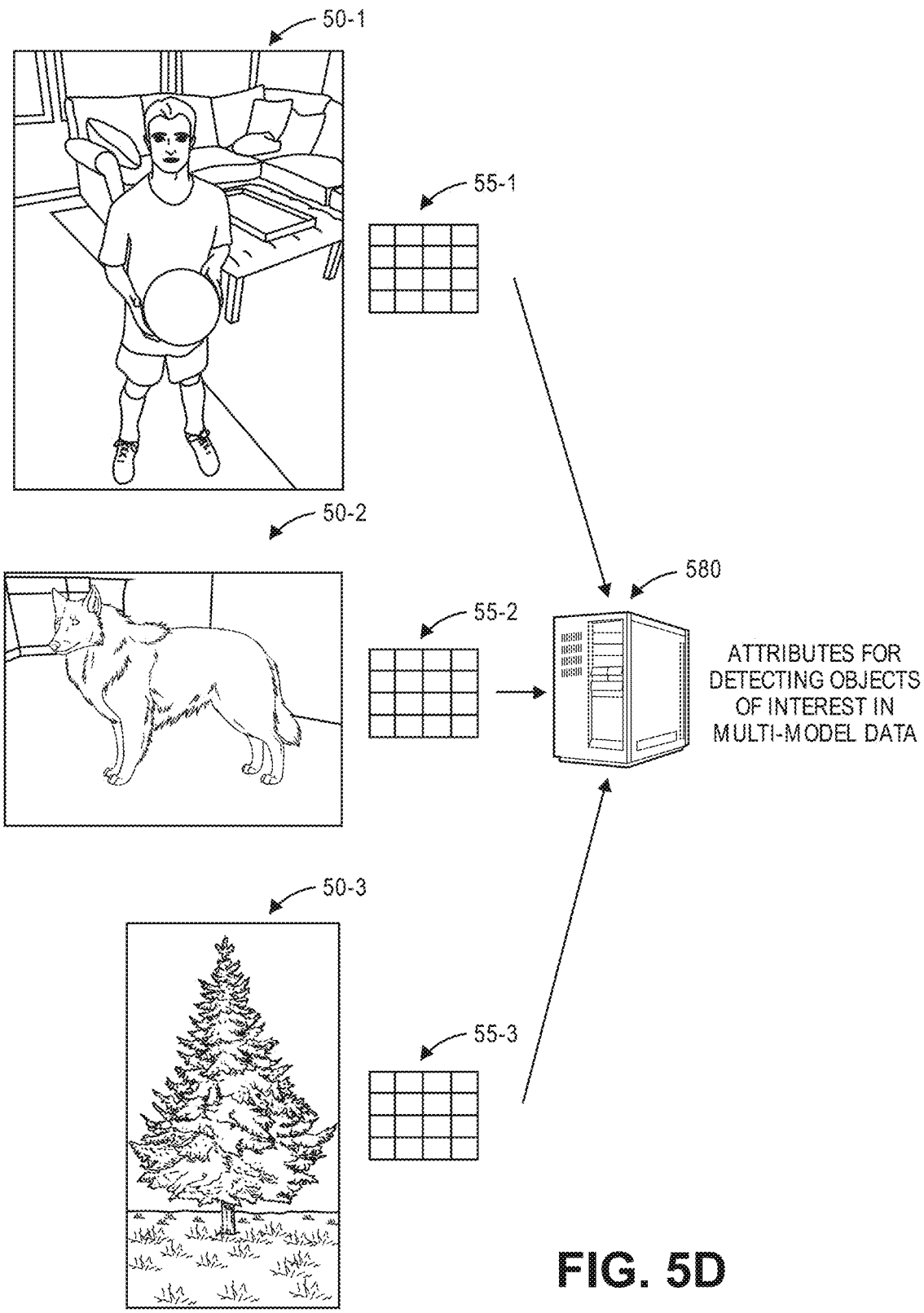

As is shown in FIG. 5D, the visual images 550-1, 550-2, 550-3 and the attributes of the objects of interest 50-1, 50-2, 50-3, and other images and corresponding attributes, may be provided to a server 580 or other system that is configured to detect objects of interest within multi-modal data captured by multiple sensors, e.g., visual imaging data, or any other type or form of data such as thermal, radiographic, ultraviolet or other data. The server 580 or other system may operate in one or more physical locations, in one or more alternate or virtual locations, such as a "cloud"-based environment, onboard one or more vehicles, or in any other location.

In some embodiments, two or more calibrated sensors operating in different modalities may be provided in association with one another in a substantially permanent manner and configured to capture data within their respective modalities from a scene. In other embodiments, however, such as the aerial vehicle 110 of FIG. 1A, a secondary sensor or sensing system operating in one modality may be temporarily associated with another system having a primary sensor operating in a different modality. For example, the secondary sensor may be provided in an integral, self-contained unit or housing that may be temporarily joined to a vehicle or other platform having the primary sensor provided thereon. The primary sensor and the secondary sensor may be calibrated and operated in concert with one another to capture data, from which annotations to a set of data captured by the primary sensor may be made based at least in part on a set of data captured by the secondary sensor.

Figure 6A:
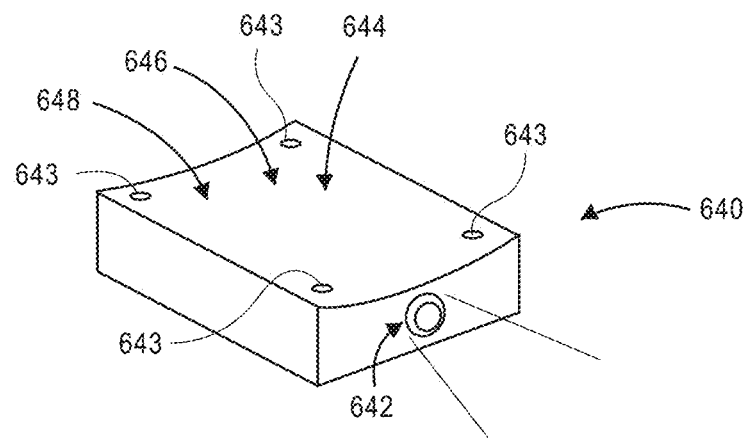
FIGS. 6A through 6C are views of aspects of one system for annotating images based on multi-modal sensor data in accordance with embodiments of the present disclosure.
Figure 6B:
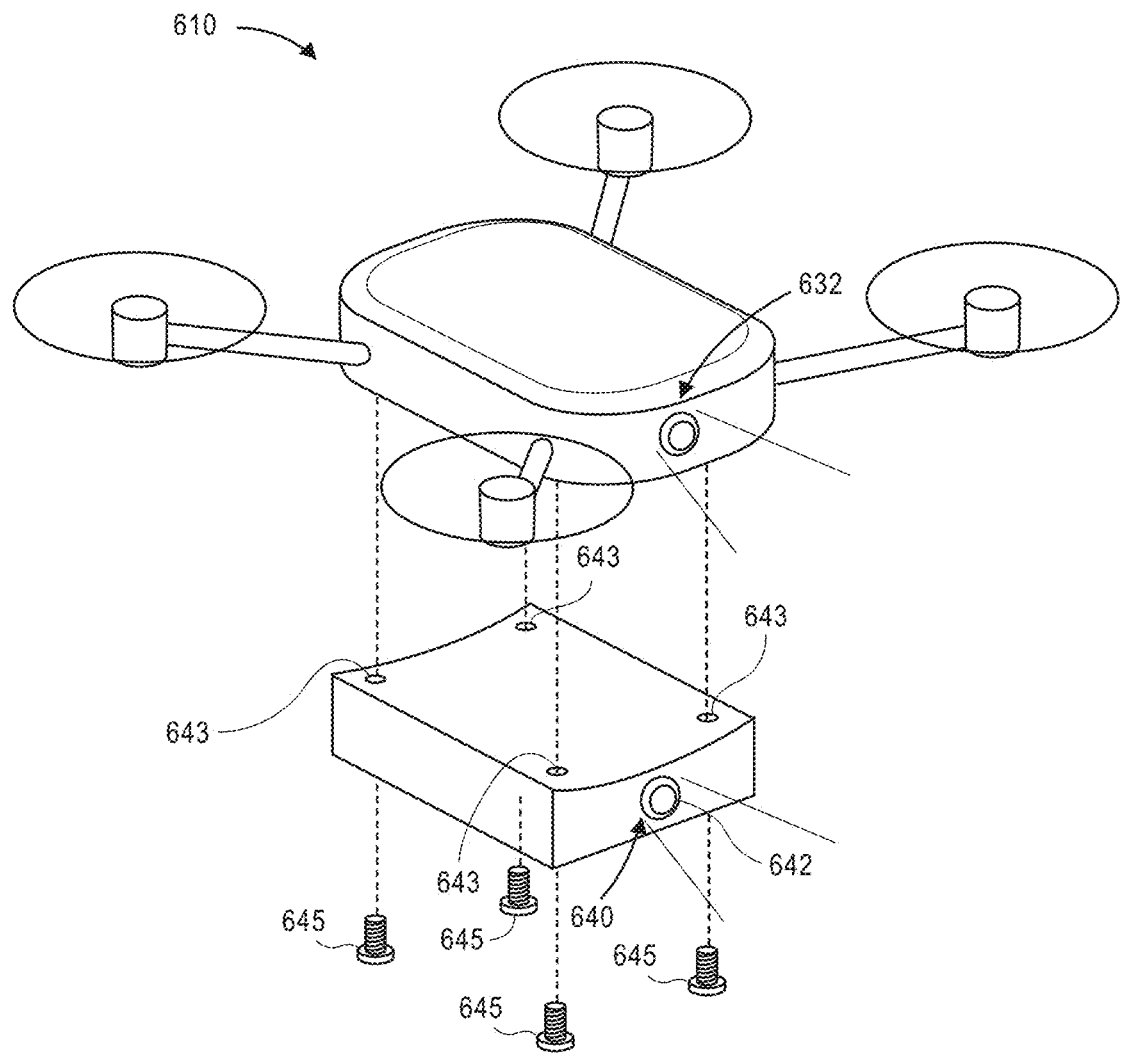
Figure 6C:
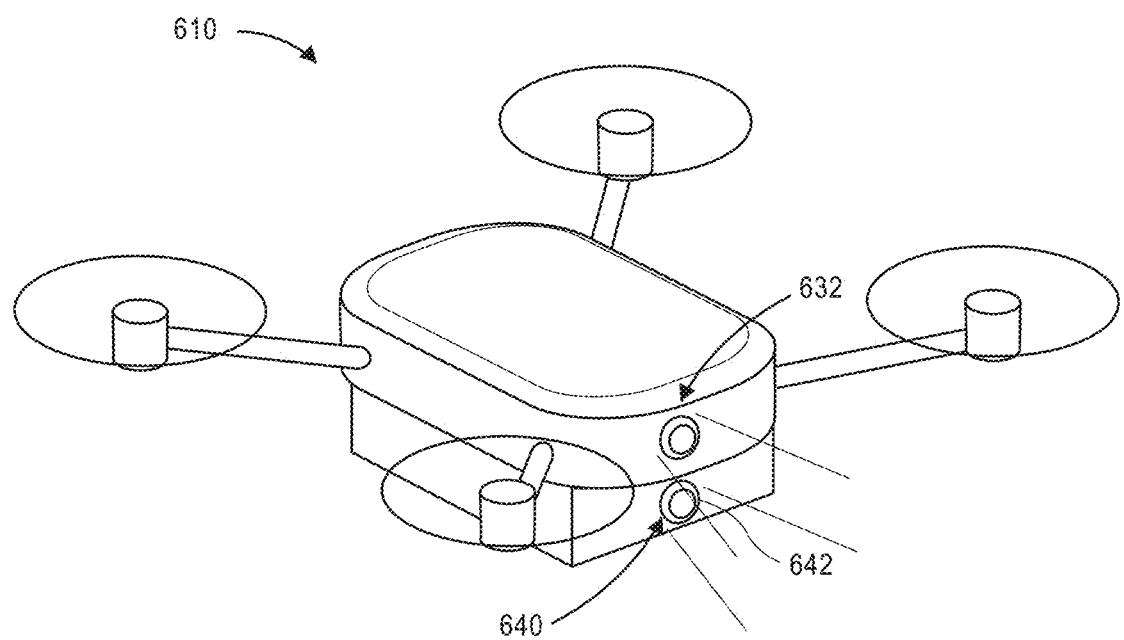

Referring to FIGS. 6A through 6C, views of aspects of one system for annotating images based on multi-modal sensor data in accordance with embodiments of the present disclosure are shown. Except where otherwise noted, reference numerals preceded by the number "6" shown in FIGS. 6A through 6C indicate components or features that are similar to components or features having reference numerals preceded by the number "5" shown in FIGS. 5A through 5D, by the number "4" shown in FIGS. 4A and 4B, by the number "2" shown in FIG. 2 or by the number "1" shown in FIGS. 1A through 1H.

As is shown in FIG. 6A, a secondary sensing system 640 may include a secondary sensor 642 that is configured to operate in one or more modalities, as well as one or more processors 644, one or more memory components 646 and/or one or more power supplies 648. The secondary sensor 642, the processor 644, the memory components 646 and/or the power supplies 648 may be provided in a common housing that may be formed from plastic, metal, fiberglass, wood, canvas, leather or any other suitable lightweight, durable materials. Additionally, as is also shown in FIG. 6A, the common housing including one or more of the secondary sensor 642, the processors 644, the memory components 646 and/or the power supplies 648 may further include one or more bolt holes 643 for enabling the secondary sensing system 640 to be coupled to one or more surfaces of a system including a primary sensor, such as an aerial vehicle.

In some embodiments, the secondary sensor 642 may be any type or form of imaging device, such as a thermal camera (or an infrared camera), a radiographic camera or an ultraviolet camera, or any other type or form of sensor. The processors 644 may be configured to operate the sensor 642, including any photosensitive surfaces, filters, chips, electrodes, clocks, boards, timers or any other components. Additionally, the processors 644 may be configured to initiate and/or control operations of the secondary sensor 642, or to store data captured using the secondary sensor 642 within the one or more memory components 646, which may include one or more fixed or removable drives, disks, flash memory, magnetic or optical cards, or other media. The power supplies 648 may include one or more fixed or removable batteries or other power cells. Alternatively, in some embodiments, the secondary sensing system 640 need only include the secondary sensor 642, which may be specifically equipped or outfitted with one or more processors, memory components or power supplies. In some other embodiments, operations of the secondary sensor 642 may be initiated or controlled by one or more processors provided aboard the aerial vehicle 610 (not shown). Likewise, in some other embodiments, the secondary sensor 642 may transfer data to one or more memory components provided aboard the aerial vehicle 610 (not shown), or receive power from one or more power supplies provided aboard the aerial vehicle 610 (not shown).

The bolt holes 643 may be any aperture or other opening capable of accommodating one or more bolts or other fasteners therethrough. The bolt holes 643 may be arranged in a discrete pattern on one surface of the secondary sensing system 640, thereby enabling one or more bolts or other fasteners to extend therethrough, and joined to a corresponding pattern of bolt holes (e.g., stud bolt holes) on one surface of the aerial vehicle 610.

As is shown in FIGS. 6B and 6C, the secondary sensing system 640 may be joined to an underside of the aerial vehicle 610, which further includes a primary sensor 632, along with one or more propulsion motors, control surfaces, frames, appurtenances or other components. The secondary sensing system 640 is joined to the underside of the aerial vehicle 640 by extending a plurality of bolts 645 through the holes 643 in the secondary sensing system 640 and into an underside of the aerial vehicle 610 (not shown). The bolts 645 may be any threaded fasteners of any type (e.g., lag bolts, carriage bolts, socket bolts, button-head bolts) that are capable of mechanically coupling the secondary sensing system 640 to the aerial vehicle 610, and have any sufficient properties in tension or friction. The bolts 645 may be formed from any materials (e.g., steel, bronze) and may have any diameter, length and/or thread pitch or count. Alternatively, the secondary sensing system 640 may further include one or more additional or alternate fastening or attachment mechanisms such as such as pins, screws, clamps, straps or others. Such mechanisms may be formed from metal, wood, leather, fabric (e.g., woven or non-woven), rubber, synthetic, composite or any other materials having sufficient properties in tension and/or friction.

The secondary sensor 642 and the primary sensor 632 may be calibrated upon coupling the secondary sensing system 640 to the aerial vehicle 610. Because the bolt holes 643 are arranged in a discrete pattern that matches a corresponding pattern of bolt holes on the underside of the aerial vehicle 610, an orientation of the secondary sensor 642 with respect to the primary sensor 632 may be expected to remain consistent even after the secondary sensing system 640 is adhered to or removed from the aerial vehicle 610 any number of times. Accordingly, after the secondary sensor 642 and the primary sensor 632 have been calibrated once, the secondary sensor 642 and the primary sensor 632 may be considered calibrated each and every time that the secondary sensing system 640 is coupled to the aerial vehicle 610, and operated in concert to capture data in their respective modalities. Alternatively, where the secondary sensing system 640 is coupled to the aerial vehicle 610 by one or more alternate fastening systems, e.g., straps or the like, the secondary sensor 642 and the primary sensor 632 may require calibration each time that the secondary sensing system 640 is coupled to the aerial vehicle 610.

In some embodiments, the primary sensor 632 may be a digital camera configured to capture visual images (e.g., color, grayscale or black-and-white images) during in-flight operations for any purpose. As is discussed above, the secondary sensor 642 may be a thermal camera (or an infrared camera), a radiographic camera or an ultraviolet camera, or any other type or form of sensor calibrated with the primary sensor 632. Thus, when the primary sensor 632 and the secondary sensor 642 are operated in concert with one another, the primary sensor 632 may capture visual images, as the secondary sensor 642 is operated to capture thermal images, radiographic images, ultraviolet images, or any other data.

After a sufficient amount of data (e.g., number of image frames) has been synchronously (or nearly synchronously) captured by the secondary sensor 642, the secondary sensing system 640 may be uncoupled from the aerial vehicle 610, thereby enabling the aerial vehicle 610 to conduct one or more operations or missions. The data captured by both the primary sensor 632 and the secondary sensor 642 may then be processed in their respective modalities to detect and recognize any objects therein, e.g., based on one or more attributes, and annotated accordingly.

Figure 7A:
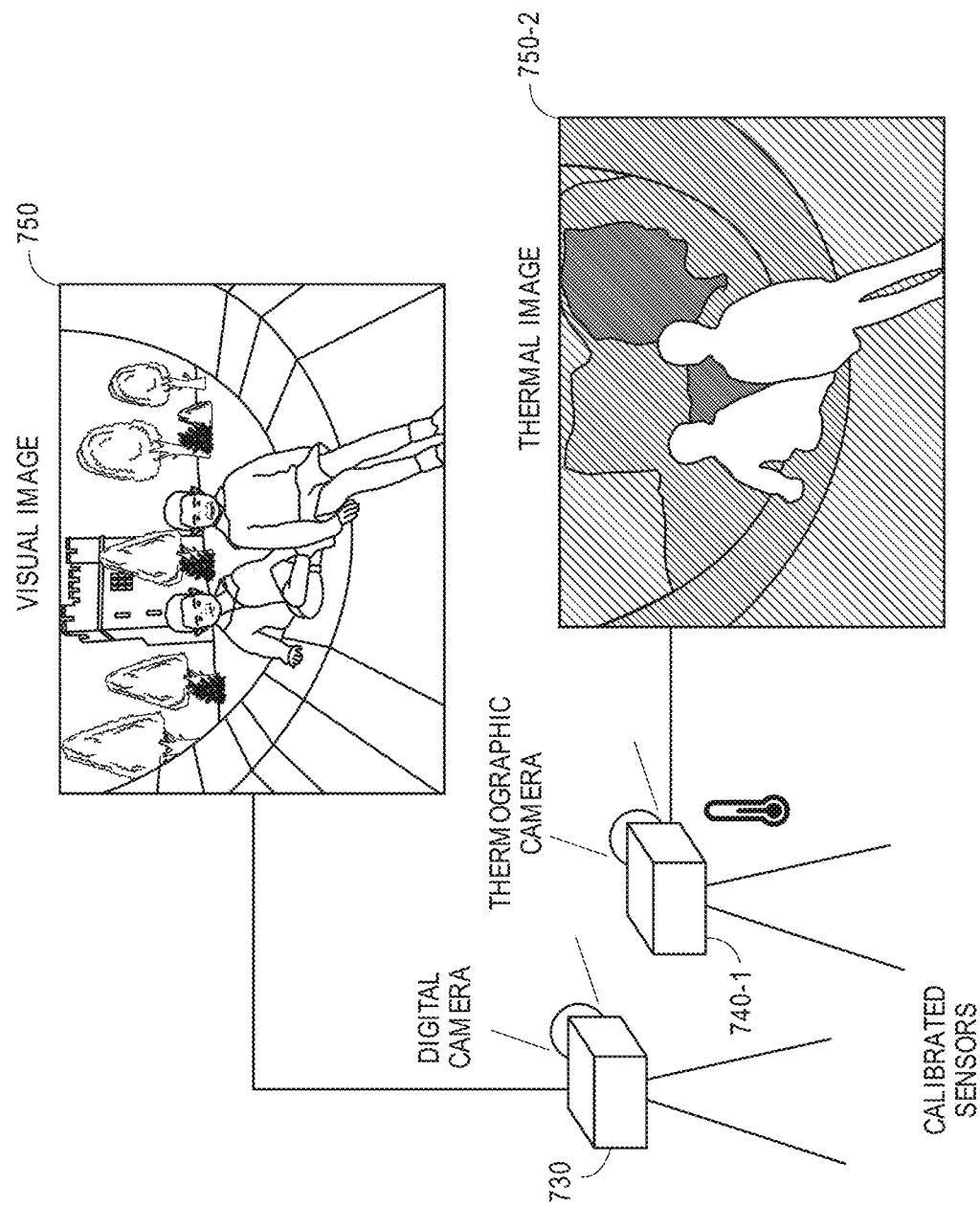
FIGS. 7A through 7C are views of aspects of one system for annotating images based on multi-modal sensor data in accordance with embodiments of the present disclosure.
Figure 7B:
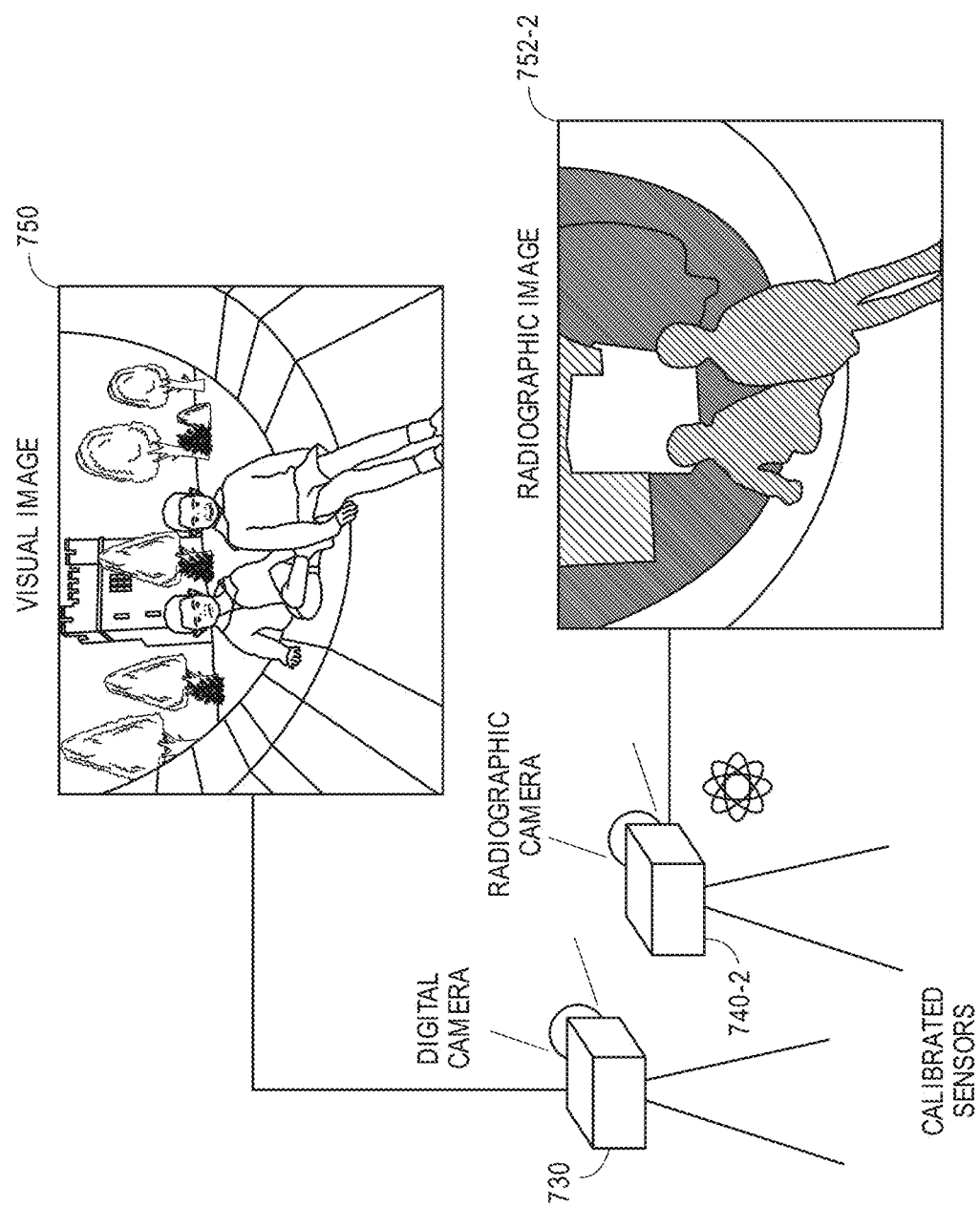
Figure 7C:
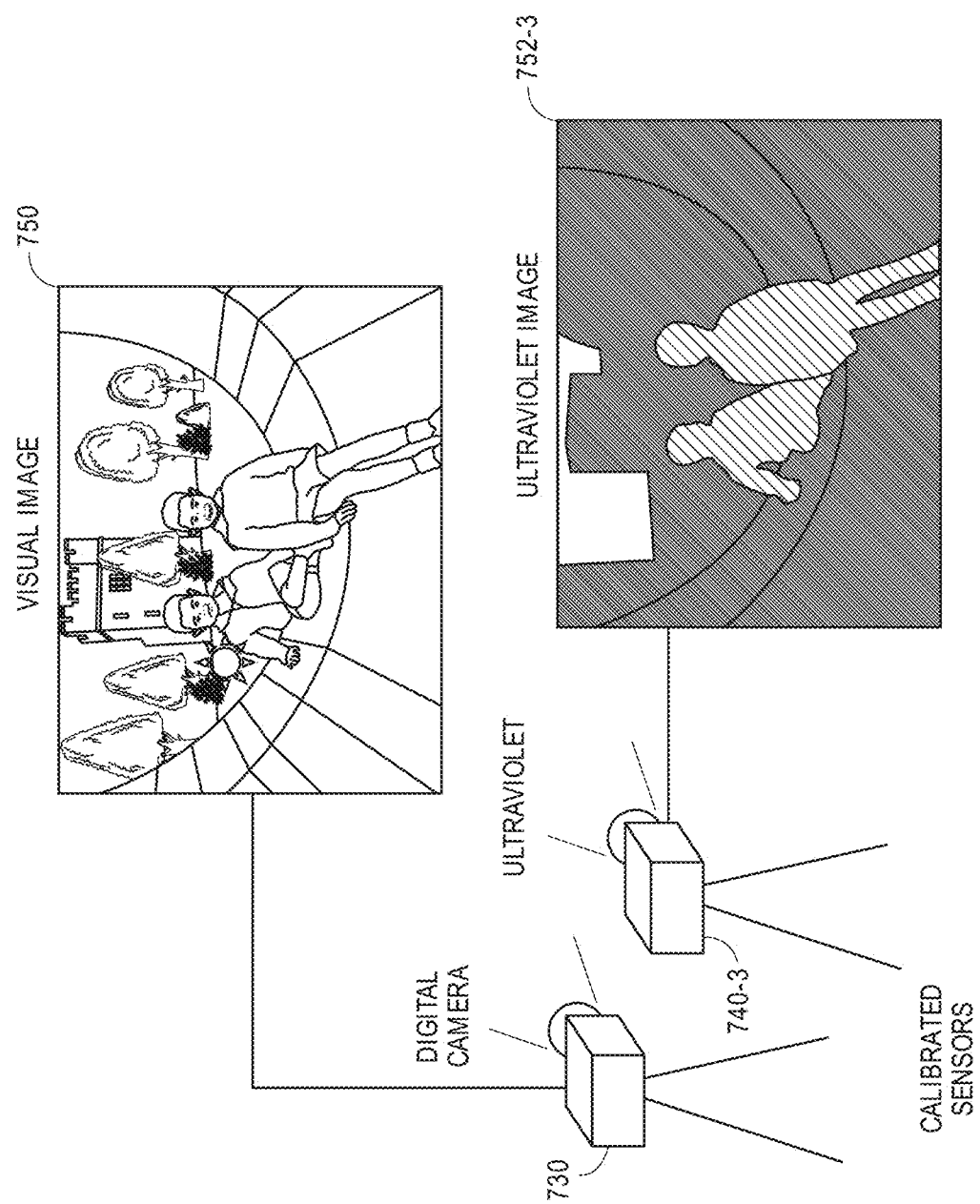

As is discussed above, any type or form of sensors operating in different modalities may be utilized in concert with one another to annotate images in accordance with the present disclosure. Referring to FIGS. 7A through 7C, views of aspects of one system for annotating images based on multi-modal sensor data in accordance with embodiments of the present disclosure are shown. Except where otherwise noted, reference numerals preceded by the number "7" shown in FIGS. 7A through 7C indicate components or features that are similar to components or features having reference numerals preceded by the number "6" shown in FIGS. 6A through 6C, by the number "5" shown in FIGS. 5A through 5D, by the number "4" shown in FIGS. 4A and 4B, by the number "2" shown in FIG. 2 or by the number "1" shown in FIGS. 1A through 1H.

For example, as is shown in FIG. 7A, a digital camera 730 and a thermographic camera 740-1 are calibrated and aligned to capture data from a common scene in different modalities, e.g., a visual image 750 and a thermal image 752-1. The visual image 750 and the thermal image 752-1 may be processed independently or together to recognize one or more objects of interest therein based on attributes of the objects within such modalities. For example, where one or more aspects of an object is potentially detected within a portion of the visual image 750, e.g., based on one or more visual attributes of the object, a corresponding portion of the thermal image 752-1 may be evaluated to determine whether the corresponding portion depicts one or more aspects of the object, e.g., based on one or more thermal attributes of the object. To the extent that aspects of an object are depicted in corresponding portions of sets of data captured by calibrated sensors in different modalities, a probability or confidence level that the data depicts the object may be enhanced, and an annotation identifying the object in such portions may be stored in association with either or both of the sets of data.

The systems and methods of the present disclosure are not limited to the use of thermal images or thermal imaging devices to annotate images. For example, as is shown in FIG. 7B, a radiographic camera 740-2 may be calibrated with the digital camera 730 and aligned to capture data from the common scene in different modalities, e.g., the visual image 750 and a radiographic image 752-2. The visual image 750 and the radiographic image 752-2 may be processed independently or together to recognize one or more objects of interest therein based on attributes of the objects within such modalities. Alternatively, as is shown in FIG. 7C, an ultraviolet camera 740-3 may be calibrated with the digital camera 730 and aligned to capture data from the common scene in different modalities, e.g., the visual image 750 and an ultraviolet image 752-3. The visual image 750 and the ultraviolet image 752-3 may be processed independently or together to recognize one or more objects of interest therein based on attributes of the objects within such modalities. In some embodiments, data captured in three or more modalities, e.g., each of the visual image 750, the thermal image 752-1, the radiographic image 752-2 and the ultraviolet image 752-3, may be processed in order to determine whether such data depicts or represents one or more objects of interest, and a detection of an object of interest in one modality may be transposed to any or all of the other modalities.

Figure 8A:
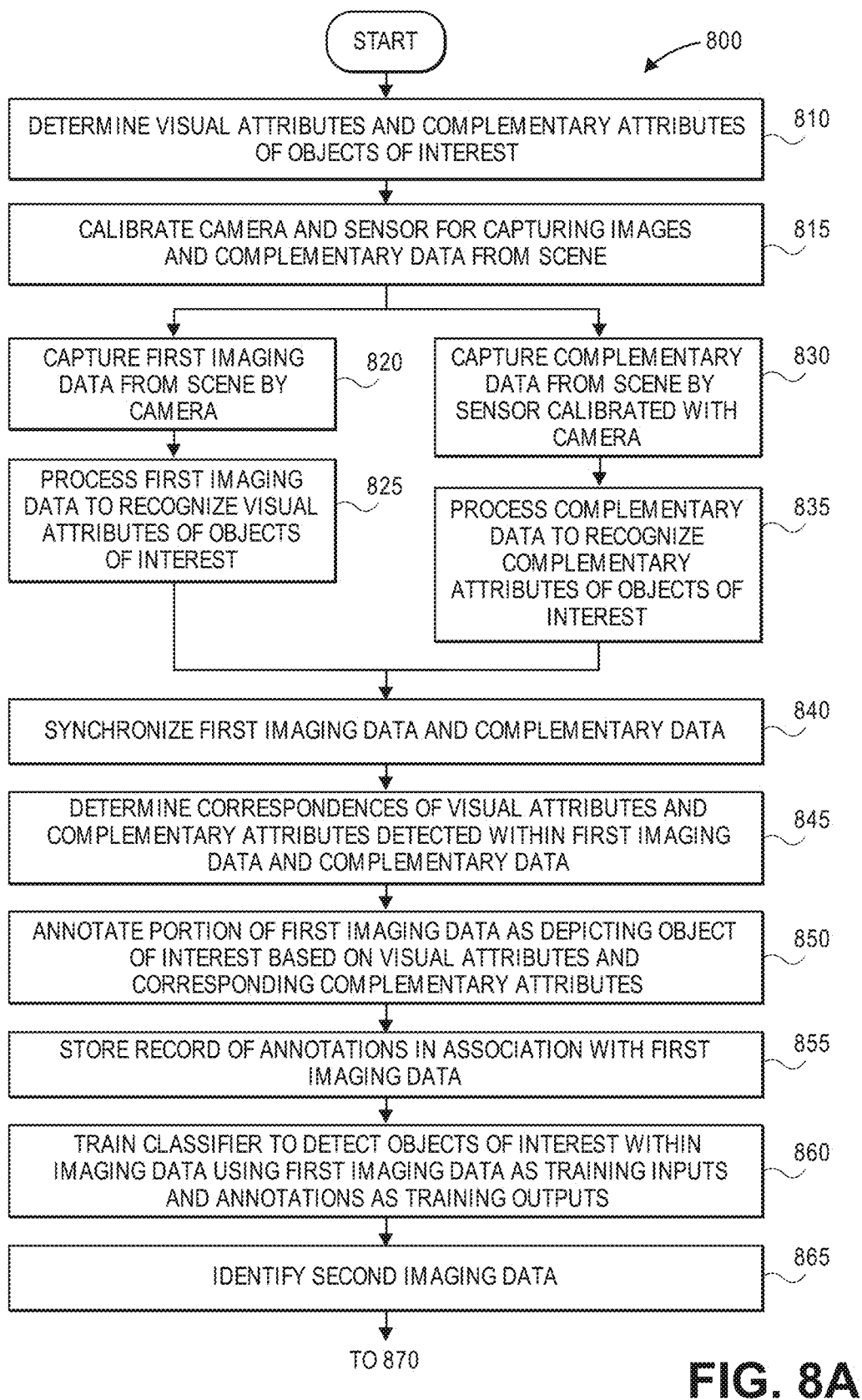
FIGS. 8A and 8B are a flow chart of one process for annotating images based on multi-modal sensor data in accordance with embodiments of the present disclosure.
Figure 8B:
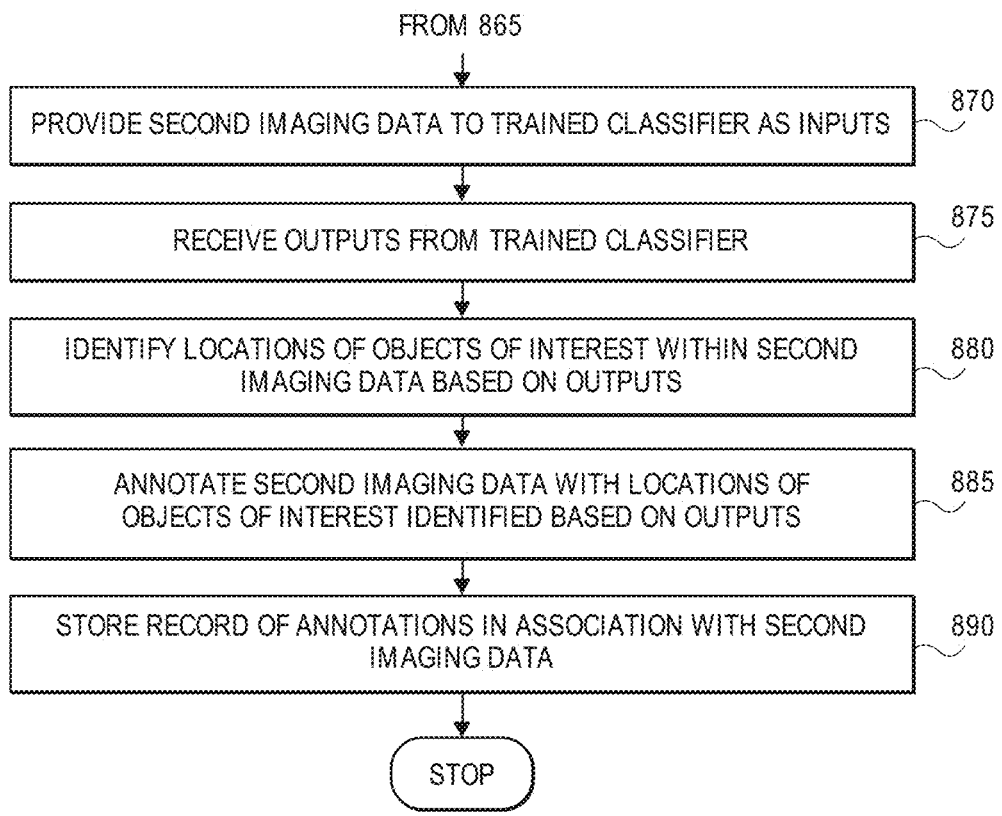

Imaging data, or other data, that is annotated to identify portions thereof depicting one or more objects of a given type therein using data captured in other modalities may be used to train an object detection algorithm to detect objects of the type. Referring to FIGS. 8A and 8B, a flow chart 800 of one process for annotating images based on multi-modal sensor data in accordance with embodiments of the present disclosure is shown.

At box 810, visual attributes and complementary attributes of objects of interest are determined. For example, the visual attributes may relate to any edges, contours, outlines, colors, textures, silhouettes, shapes or other characteristics of any number of objects of interest within a visual modality, as well as one or more dimensions of the objects of interest, expected poses or orientations of the object of interest, any expected actions to be performed by or in association with the objects of interest, or any qualitative or quantitative data regarding the object of interest that may be visually represented within imaging data, such as is shown in FIGS. 5A through 5D. The complementary attributes may relate to any aspects, features of other characteristics of the objects that may be detectable within complementary data, such as a heat signature (or infrared signature), a radiographic signature or an ultraviolet signature of the objects, or any other signature, profile, or other description of the objects, and in any qualitative or quantitative manner, e.g., using imagery, text, numbers, variables or the like. For example, where an object of interest is a giraffe, visual attributes of the giraffe may include qualitative labels or descriptors such as dolichomorphic build, elongated neck, sloping back, short torso, slender legs, long tail, prehensile tongue, ossicone horns, or the like, or labels of coat colors such as brown, orange, yellow or white, as well as quantitative descriptors such as heights (e.g., 10 to 15 feet or 3.8 to 4.7 meters), masses (e.g., 500 to 2000 pounds, or 450 to 1800 kilograms), or top speeds (32 to 37 miles per hour), as well as identifiers of coat colors according to one or more quantitative standards, e.g., the RGB color model. Similarly, where the sensor is a thermal camera configured to capture one or more thermographs, the complementary attributes may include qualitative or quantitative data regarding giraffes including their typical body temperatures, e.g., 100 to 102 degrees Fahrenheit, or 38 to 39 degrees Celsius, as well as any other data regarding the manner by which giraffes thermoregulate themselves, e.g., by orienting their bodies to maximize radiant heat gain or to maximize convective heat loss, such as through high respiratory evaporative heat loss. At box 815, a camera and another sensor are calibrated for capturing images and complementary data, respectively, from a scene. The camera and the sensor may be provided aboard an aerial vehicle, such as is shown in FIG. 1A, or in association with any other setting or structure. Alternatively, the sensor may be provided in the form of a secondary sensing system that may be physically mounted in association with the camera and calibrated accordingly, such as is shown in FIGS. 6A through 6C.

At box 820, first imaging data is captured from the scene by the camera, and at box 825, the first imaging data is processed to recognize visual attributes of one or more of the objects of interest, e.g., by one or more machine learning algorithms or techniques. In some embodiments, one or more algorithms or techniques may be used to recognize any edges, contours, outlines, colors, textures, silhouettes, shapes or other characteristics of objects, or portions of objects, expressed in the first imaging data (e.g., still or moving digital images), and any of such characteristics that are identified within the first imaging data may be compared to the visual attributes of the object of interest determined at box 810, in order to determine whether any of such characteristics may correspond to one or more of the objects of interest. In some embodiments, whether the first imaging data depicts one or more of the objects of interest may be determined qualitatively or quantitatively, e.g., by a numerical score such as a confidence score or other metric indicating a likelihood or a probability that one or more of the objects of interest is depicted within the first imaging data.

In parallel, at box 830, complementary data is captured from the scene by the sensor, which is calibrated with the camera, and at box 835, the complementary data is processed to recognize complementary attributes of the objects of interest within the complementary data. For example, where the sensor is a thermal camera configured to capture one or more thermographs, a thermograph may be processed to determine whether any of the temperature contrasts depicted therein corresponds to one or more of the temperature-based attributes, e.g., whether any aspects of the complementary data correspond to internal or external temperature localities or gradients of an object, or any other thermal features of the object, such as temporal or spatial variations in temperature or emitted heat from the object. In some embodiments, whether the complementary data depicts one or more of the objects of interest may be determined qualitatively or quantitatively, e.g., by a numerical score such as a confidence score or other metric indicating a likelihood or a probability that one or more of the objects of interest is depicted within the complementary data.

At box 840, the first imaging data and the complementary data are synchronized. For example, where the first imaging data comprises a plurality of image frames depicting the scene captured by the camera during a period of time, and the complementary data comprises a plurality of image frames or other representations of the scene captured by the sensor during the same period of time, the respective image frames and representations that were captured simultaneously or nearly simultaneously may be identified, e.g. based on time stamps or other identifiers, either in real time as the image frames and representations are captured, or at a later time.

At box 845, correspondences of the visual attributes within the first imaging data and complementary attributes detected within the complementary data are determined. For example, where a portion of one or more visual images of the first imaging data is determined to depict a frame of a specific model of automobile in motion, to a sufficiently high degree of confidence, and where a corresponding portion of one or more thermal images or other heat-based complementary data is determined to depict a heat signature that is identical or similar to a heat signature of the specific model of automobile during operation, the corresponding portions of the visual images and the thermal images may be determined to more likely correspond to one of the specific model of automobile. A determination that the corresponding portions of the visual images and the thermal images each correspond to the specific model of automobile may be made with an even greater degree of confidence than that of the detections of the specific model in either the visual images or the thermal images alone.

At box 850, the portion of the first imaging data is annotated as depicting an object of interest based on the visual attributes and the corresponding complementary attributes. For example, the annotation may include coordinate pairs or other identifiers of pixels of interest corresponding to the portion of the first imaging data depicting the object of interest. At box 855, a record of the annotations is stored in association with the first imaging data, e.g., in a record maintained separately from the first imaging data, in metadata of the first imaging data, or in any other manner.

At box 860, a classifier is trained to detect objects of interest within imaging data using the first imaging data as training inputs and the annotations maintained in the record stored at box 855 as training outputs. In some embodiments, the classifier may be a deep neural network, e.g., a feedforward neural network such as a multi-layer perceptrons ("MLP") network, a radial basis function ("RBF") network, or a wavelet network. In some other embodiments, the classifier may be a convolutional neural network, a recurrent network (e.g., fully connected networks, long short-term memory, or LSTM, networks, gated recurrent units, or GRU, or echo state networks), or a spiking neural network. Any type or form of multi-class classification or logistic regression systems or methods including but not limited to decision forests or jungles, kernel methods or nearest neighbor methods may also be utilized. The classifier may be deemed trained when the classifier predicts, for the first imaging data, locations of annotations within corresponding respective image frames to within a sufficiently high, predetermined degree of tolerance.

At box 865, second imaging data is identified. The second imaging data may have been captured using the same camera that captured the first imaging data at box 820, or a different camera. The second imaging data may include a plurality of still or moving visual image frames, e.g., color, grayscale or black-and-white image frames, or any other type or form of visual imaging data. At box 870, the second imaging data is provided to the trained classifier as inputs. The second imaging data may be fed to a neural network or other classifier along with, optionally, intrinsic or extrinsic information or data regarding the second imaging data and/or the scene or objects of interest.

At box 875, outputs are received from the trained classifier, and at box 880, locations of the objects of interest within the second imaging data are identified based on the outputs. The outputs may specify not only portions of a given image frame of the second imaging data that depict one or more of the objects of interest but also include a confidence level or interval (e.g., a percentage or number of standard deviations from the mean, or a margin of error above or below the mean) associated with a probability or likelihood that such portions actually depict one or more of the objects of interest.

At box 885, the second imaging data is annotated with the locations of the objects of interest identified based on the outputs. At box 890, a record of the annotations is stored in association with the second imaging data, e.g., in a record maintained separately from the second imaging data, or in metadata of the second imaging data, and the process ends.

Although some of the embodiments disclosed herein reference the annotation of video files captured in a commercial setting, e.g., within a materials handling facility such as a fulfillment center, the systems and methods of the present disclosure are likewise not so limited. Rather, the systems and methods disclosed herein may be utilized to annotate any images or video files captured by any number of imaging devices for any purpose, or to utilize the annotations of such video files in any application. Moreover, although some of the embodiments disclosed herein reference using data captured in two or more modalities (e.g., visual imaging data and one or more other modalities) in order to identify annotations of objects within data captured within one or more of the modalities (e.g., within the visual imaging data) for use in training machine learning algorithms, the systems and methods of the present disclosure are not so limited. Rather, some of the embodiments disclosed herein may be used to merely enhance the likelihood that a given detection of an object within data captured according to one modality does, in fact, correspond to the object based on data captured according to another modality, regardless of whether any annotations are subsequently generated, or whether the data and any annotations so generated are ever used to train a machine learning algorithm. For example, one or more of the embodiments disclosed herein may be used to enhance one or more traditional classification problems, e.g., for classifying data captured in one modality, by utilizing data captured in one or more other modalities.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various embodiments as defined by the appended claims. Additionally, it should also be appreciated that the detailed description is set forth with reference to the accompanying figures. In the figures, the use of the same reference numbers in different figures indicates similar or identical items or features. Except where otherwise noted, left-most digit(s) of a reference number identify a figure in which the reference number first appears, while two right-most digits of a reference number in a figure indicate a component or a feature that is similar to components or features having reference numbers with the same two right-most digits in other figures.

Moreover, with respect to the one or more methods or processes of the present disclosure shown or described herein, including but not limited to the flow charts shown in FIG. 3 or 8A and 8B, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular implementation.

The elements of a method, process, or algorithm described in connection with the embodiments disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be connected to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. An aerial vehicle comprising:
   a plurality of propulsion motors, wherein each of the propulsion motors comprises a propeller and a drive shaft, and wherein each of the propulsion motors is configured to rotate the propeller about an axis defined by the drive shaft;
   a digital camera configured to capture one or more visual images;
   a thermal camera configured to capture one or more thermal images, wherein the digital camera and the thermal camera are calibrated and aligned with fields of view that overlap at least in part; and
   a control system having at least one computer processor, wherein the control system is in communication with each of the digital camera, the thermal camera and the plurality of propulsion motors, and wherein the at least one computer processor is configured to execute one or more instructions for performing a method comprising:
   initiating a first operation of at least one of the plurality of propulsion motors;

during the first operation,
  capturing a first plurality of visual images by the digital camera; and
  capturing a second plurality of thermal images by the thermal camera;
receiving information regarding at least one visual attribute and at least one thermal attribute of an object;
detecting the at least one visual attribute of the object within a first portion of a first one of the first plurality of visual images;
detecting the at least one thermal attribute of the object within a second portion of a second one of the second plurality of thermal images;
determining that the first portion of the first one of the first plurality of visual images corresponds to the second portion of the second one of the second plurality of thermal images;
generating an annotation of the first one of the first plurality of visual images based at least in part on at least one of the first portion of the first one of the first plurality of visual images or the second portion of the second one of the second plurality of thermal images;
storing the annotation in association with at least the first one of the first plurality of visual images;
providing at least the first one of the first plurality of visual images to a classifier as a training input;
providing at least the annotation to the classifier as a training output;
training the classifier using at least the training input and the training output;
capturing at least a second plurality of visual images by the digital camera;
providing at least one of the second plurality of visual images to the classifier as an input;
receiving an output from the classifier; and
identifying a portion of the at least one of the second plurality of visual images depicting the object based at least in part on the output.

2. The aerial vehicle of claim 1, wherein determining that the first portion of the first one of the first plurality of visual images corresponds to the second portion of the second one of the second plurality of thermal images:
  determining at least a first coordinate pair of the first portion of the first one of the first plurality of visual images; and
  identifying at least a second coordinate pair of the second portion of the second one of the second plurality of thermal images, wherein the second coordinate pair corresponds to the first coordinate pair.

3. The aerial vehicle of claim 1, wherein detecting the at least one visual attribute of the object within the first portion of the first one of the first plurality of visual images comprises:
  determining a first probability that the first portion of the first one of the first plurality of visual images depicts the object,
  wherein the method further comprises:
  in response to detecting the at least one thermal attribute of the object within the second portion of the second one of the second plurality of thermal images,
    determining a second probability that the first portion of the first one of the first plurality of visual images depicts the object,
  wherein the second probability is greater than the first probability.

4. The aerial vehicle of claim 1, further comprising:
  a secondary sensing system comprising a housing having the thermal camera, at least one processor, at least one memory component and at least one power supply therein,
  wherein the secondary sensing system further comprises a first plurality of bolt holes extending therethrough arranged in a pattern,
  wherein the aerial vehicle further comprises at least one external surface having a second plurality of bolt holes arranged in the pattern,
  wherein the secondary sensing system is affixed to the at least one external surface of the aerial vehicle by way of a plurality of bolts, and
  wherein each of the plurality of bolts extends through one of the first plurality of bolt holes and into one of the second plurality of bolt holes.

5. The aerial vehicle of claim 1, wherein the object is a human, a non-human animal, an artificial structure or a natural structure.

6. A method comprising:
  capturing first data from a scene by a first sensor operating in a first modality;
  capturing second data from the scene by at least a second sensor operating in a second modality, wherein the second sensor is calibrated with the first sensor, and wherein a first field of view of the first sensor overlaps with a second field of view of the second sensor at least in part, wherein one of the first data or the second data comprises visual imaging data, and wherein one of the first data or the second data does not include visual imaging data;
  detecting at least a first attribute of an object of a type in a first portion of a first representation of at least some of the first data, wherein the first representation is generated based at least in part on at least some of the first data captured at a first time;
  identifying at least a second portion of a second representation of at least some of the second data, wherein the second portion of the second representation corresponds to at least the first portion of the first representation;
  providing the at least some of the second data as a second input to a second object detection algorithm, wherein the second object detection algorithm is configured to detect an object of the type within data of the second modality;
  receiving a second output from the second object detection algorithm; and
  detecting at least a second attribute of an object of the type in the second portion of the second representation of the second data based at least in part on the second output, wherein the second attribute is one of an edge, a contour, an outline, a color, a texture, a silhouette or a shape of an object of the type;
  generating at least one annotation of an object of the type based at least in part on at least one of the first portion of the first representation or the second portion of the second representation;
  storing at least one annotation in association with at least some of the second data;
  capturing third data by a third sensor operating in at least one of the first modality or the second modality;
  providing at least some of the third data to a classifier as an input, wherein the classifier is trained to detect an object of the type within data of at least one of the first modality or the second modality based at least in part on at least one of the first portion of the first representation or the second portion of the second representation as a training input and the at least one annotation as a training output;

receiving an output from the classifier; and detecting at least a portion of an object of the type within a third representation of the third data based at least in part on the output received from the classifier.

7. The method of claim 6, wherein identifying at least the second portion of the second representation comprises:

determining at least a first coordinate pair of the first portion of the first representation based at least in part on the first attribute of the object of the type; and identifying at least a second coordinate pair of the second representation based at least in part on the first coordinate pair of the first portion of the first representation, wherein the second portion of the second representation is identified based at least in part on the second coordinate pair.

8. The method of claim 6, wherein the second sensor is one of:

a thermal imaging device configured to capture thermal imaging data;

a radiographic imaging device configured to capture radiographic imaging data; or an ultraviolet imaging device configured to capture ultraviolet imaging data.

9. The method of claim 6, wherein the first sensor is a digital camera configured to capture at least one of color visual imaging data, grayscale visual imaging data or black-and-white visual imaging data.

10. The method of claim 6, further comprising:

providing the at least some of the first data as a first input to a first object detection algorithm, wherein the first object detection algorithm is configured to detect at least a portion of an object of the type within data of the first modality;

receiving a first output from the first object detection algorithm; and detecting at least the first attribute in the first portion of the first representation of the first data based at least in part on the first output, wherein the first attribute is one of a thermal property, a radiographic property or an ultraviolet property associated with an object of the type.

11. The method of claim 6, wherein the object of the type is a human, a non-human animal, an artificial structure or a natural structure.

12. A method comprising:

affixing a sensing system to at least a portion of an unmanned aerial vehicle, wherein the unmanned aerial vehicle comprises a first sensor, wherein the sensing system comprises a second sensor, wherein the second sensor is calibrated with the first sensor, and wherein a first field of view of the first sensor overlaps with a second field of view of the second sensor;

causing the unmanned aerial vehicle to engage in at least one flight operation;

capturing first data from a scene by the first sensor operating in a first modality, wherein the first data is captured with the unmanned aerial vehicle engaged in the at least one flight operation;

capturing second data from the scene by at least the second sensor operating in a second modality, wherein the second data is captured with the unmanned aerial vehicle engaged in the at least one flight operation;

detecting at least a first attribute of an object of a type in a first portion of a first representation of at least some of the first data, wherein the first representation is generated based at least in part on at least some of the first data captured at a first time;

identifying at least a second portion of a second representation of at least some of the second data, wherein the second portion of the second representation corresponds to at least the first portion of the first representation;

in response to identifying at least the second portion of the second representation, generating at least one annotation of an object of the type based at least in part on the first portion of the first representation; and storing at least one annotation in association with at least some of the second data, wherein one of the first data or the second data comprises visual imaging data, and wherein one of the first data or the second data does not include visual imaging data; and after capturing the second data from the scene, terminating the at least one flight operation; and removing the sensing system from at least the portion of the unmanned aerial vehicle.

13. The method of claim 12, wherein the sensing system further comprises:

at least one processor in communication with the second sensor;

at least one memory component in communication with the second sensor; and at least one power supply for providing power to the second sensor, the at least one computer processor and the at least one memory component;

a housing, wherein each of the second sensor, the at least one processor, the at least one memory component and the at least one power supply is disposed within the housing;

at least one fastening apparatus for joining the housing to at least the portion of unmanned aerial vehicle.

14. The method of claim 12, wherein the object of the type is a human, a non-human animal, an artificial structure or a natural structure.

15. The method of claim 12, wherein the second sensor is one of:

a thermal imaging device configured to capture thermal imaging data;

a radiographic imaging device configured to capture radiographic imaging data; or an ultraviolet imaging device configured to capture ultraviolet imaging data.

16. A method comprising:

affixing a secondary sensing system to at least one surface of an aerial vehicle, wherein the aerial vehicle comprises a first sensor operating in a first modality, wherein the secondary sensing system comprises a second sensor operating in a second modality, and wherein a first field of view of the first sensor and a second field of view of the second sensor overlap at least in part with the secondary sensing system affixed to the at least one surface of the aerial vehicle;

initiating at least a first flight operation of the aerial vehicle;

capturing, by the first sensor, first data during the first flight operation;

capturing, by the second sensor, second data during the first flight operation;

detecting at least a first attribute of a first object within a first portion of a first representation of the first data, wherein the first attribute relates to the first modality;

identifying a second portion of a second representation of the second data corresponding to the first portion of the first representation of the first data;

determining that the second portion of the second representation depicts at least a second attribute of the first object, wherein the second attribute relates to the second modality;

generating an annotation of at least one of the first data or the second data based at least in part on the first portion or the second portion;

training at least one classifier to recognize one or more objects based at least in part on the at least one of the first data or the second data and the annotation;

removing the secondary sensing system from the at least one surface of the aerial vehicle;

initiating at least a second flight operation of the aerial vehicle;

capturing, by the first sensor, third data during the second flight operation;

providing at least some of the third data to the at least one trained classifier as an input;

receiving at least one output from the at least one trained classifier; and detecting at least a third attribute of a second object within at least a third portion of a third representation of the third data based at least in part on the at least one output.

17. The method of claim 16, wherein each of the first object and the second object is of a type,
wherein the first sensor is a digital camera,
wherein the first data is at least one of color imaging data or grayscale imaging data,
wherein the first representation is one of a color visual image or a grayscale visual image, and
wherein the first attribute is one of an edge, a contour, an outline, a color, a texture, a silhouette or a shape of the first object.

18. The method of claim 16, wherein at least one of the first object or the second object is a human, a non-human animal, an artificial structure or a natural structure.

19. The method of claim 16, wherein the second sensor is one of:
a thermal imaging device configured to capture thermal imaging data;
a radiographic imaging device configured to capture radiographic imaging data; or
an ultraviolet imaging device configured to capture ultraviolet imaging data.

20. The method of claim 16, wherein the first attribute is one of a thermal property, a radiographic property or an ultraviolet property associated with the first object.

* * * * *